(12) United States Patent
Agnoli et al.

(10) Patent No.: US 7,912,893 B2
(45) Date of Patent: Mar. 22, 2011

(54) SYSTEM, METHOD, AND COMPUTER PROGRAM PRODUCT FOR MEDIA PUBLISHING REQUEST PROCESSING

(75) Inventors: Giovanni M. Agnoli, San Francisco, CA (US); Christopher V. Pirazzi, Redwood City, CA (US); Howard Chartock, Palo Alto, CA (US); Steve Chen, Santa Clara, CA (US); Harry Chomsky, Albany, CA (US); Angela C. Lai, Mountain View, CA (US); Kerrick Lindsey, Foster City, CA (US); David Pawson, San Mateo, CA (US); Jody Shapiro, San Jose, CA (US); Daniel Weaver, Redwood City, CA (US)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 11/586,133

(22) Filed: Oct. 25, 2006

(65) Prior Publication Data
US 2007/0043808 A1 Feb. 22, 2007

Related U.S. Application Data

(62) Division of application No. 10/076,090, filed on Feb. 15, 2002, now Pat. No. 7,155,475.

(51) Int. Cl.
*G06F 15/16* (2006.01)
*H04N 7/18* (2006.01)
(52) U.S. Cl. .......................... 709/201; 725/87; 725/105
(58) Field of Classification Search .................. 709/201; 725/87, 105
See application file for complete search history.

(56) References Cited

U.S. PATENT DOCUMENTS

| 3,394,352 A | 7/1968 | Wernikoff et al. |
| 3,913,093 A | 10/1975 | De Vincentiis et al. |
| 5,526,397 A | 6/1996 | Lohman |

(Continued)

FOREIGN PATENT DOCUMENTS
EP 1 026 872 8/2000

OTHER PUBLICATIONS

"How WebMux™ Works" [oneline], Red Hill Networks, Inc. 2000 [retrieved on Jul. 5, 2001]. Retrieved from Internet: <URL: http://www.redhillnetworks.com/papers/webmux/how.htm> (2 pages).

(Continued)

*Primary Examiner* — Kenny S Lin
(74) *Attorney, Agent, or Firm* — Frommer Lawrence & Haug LLP; William S. Frommer; Thomas F. Presson

(57) ABSTRACT

A system, method, and computer program product is provided for publishing transcoded media content in response to publishing service requests from end users. A user request for media content is processed intelligently, either by directing the processing of the request to one of a set of transcoding servers so as to effectively balance the load among the servers, or by directing the processing of the request to an appropriate alternative means for satisfying the request. Transcoding tasks can be prioritized. In order to facilitate server selection, the current load on any particular transcoding server can be monitored in conjunction with a determination of the load to be created by a transcoding task. Transcoding can be performed on-demand or in a batch mode. Alternatively, a request can be satisfied by distributing media content that has already been transcoded and is resident in cache memory in anticipation of such requests.

3 Claims, 19 Drawing Sheets

U.S. PATENT DOCUMENTS

| | | | |
|---|---|---|---|
| 5,657,015 A | 8/1997 | Nakajima et al. | |
| 5,796,829 A | 8/1998 | Newby et al. | |
| 5,818,933 A | 10/1998 | Kambe et al. | |
| 5,838,927 A | 11/1998 | Gillon et al. | |
| 5,848,134 A | 12/1998 | Sekiguchi et al. | |
| 5,949,876 A | 9/1999 | Ginter et al. | |
| 5,991,795 A | 11/1999 | Howard et al. | |
| 6,061,732 A | 5/2000 | Korst et al. | |
| 6,122,290 A | 9/2000 | Kawamata | |
| 6,247,050 B1 | 6/2001 | Tso et al. | |
| 6,463,454 B1* | 10/2002 | Lumelsky et al. | 718/105 |
| 6,728,840 B1* | 4/2004 | Shatil et al. | 711/137 |
| 6,742,082 B1* | 5/2004 | Lango et al. | 711/118 |
| 6,751,673 B2 | 6/2004 | Shaw | |
| 6,820,173 B1* | 11/2004 | Bittel et al. | 711/137 |
| 7,197,749 B2* | 3/2007 | Thornton et al. | 718/101 |
| 7,240,347 B1* | 7/2007 | Lim et al. | 718/100 |
| 2001/0006562 A1* | 7/2001 | Tajime | 382/251 |
| 2002/0032777 A1 | 3/2002 | Kawata et al. | |
| 2002/0059170 A1 | 5/2002 | Vange | |
| 2002/0069420 A1 | 6/2002 | Russell et al. | |
| 2002/0099842 A1* | 7/2002 | Jennings et al. | 709/231 |
| 2002/0116293 A1 | 8/2002 | Lao et al. | |
| 2002/0184159 A1 | 12/2002 | Tadayon et al. | |
| 2003/0014630 A1 | 1/2003 | Spencer et al. | |
| 2003/0112792 A1 | 6/2003 | Cranor et al. | |

OTHER PUBLICATIONS

"Why WebMux™ ?—An Executive Summary" [oneline], Red Hill Networks, Inc. 2000 [retrieved on Jul. 5, 2001]. Retrieved from Internet: <URL: http://www.redhillnetworks.com/papers/webmux/why.htm> (5 pages).

Bourke, T. "Its Always the Load Balancer" [oneline], O'Reilly Network, Mar. 5, 2001 [retrieved on Jun. 10, 2003]. Retrieved from Internet: <URL: http://www.web.archive.org.web/20010309170737/http://sysadmin.oreilly.com/news/sbl_0301.html> (9 pages).

Rakesh Mohan et al., Content Adaptation Framework: Bringing the Internet to Information Appliances (IBM) Multimedia Services and Technology Issues, Global Telecommunications Conference—Globecom '99, pp. 2015-2021.

Richard Han et al., Dynamic Adaptation in an Image Transcoding Proxy for Mobile Web Browsing (IBM), IEEE Personal Communications, Dec. 1998, pp. 8-17.

* cited by examiner

Conventional Load Balancer (Prior Art)

On-Demand MP Request

Cached MP Request

Pass-Through MP Request

Batch Transcoding MP Request

SYSTEM, METHOD, AND COMPUTER PROGRAM PRODUCT FOR MEDIA PUBLISHING REQUEST PROCESSING

CROSS-REFERENCE TO RELATED APPLICATIONS

This is a division of application Ser. No. 10/076,090, filed Feb. 15, 2002 now U.S. Pat. No. 7,155,475, the entirety of which is incorporated herein by reference.

The present invention is related to U.S. application Ser. No. 09/742,294, filed Dec. 22, 2000, and to U.S. application Ser. No. 09/986,683, filed Nov. 9, 2001, which are incorporated herein by reference in their entirety.

STATEMENT REGARDING REFERALLY-SPONSORED RESEARCH AND DEVELOPMENT

Not applicable.

REFERENCE TO MICROFICHE APPENDIX/SEQUENCE LISTING/TABLE/COMPUTER PROGRAM LISTING APPENDIX (SUBMITTED ON A COMPACT DISC AND AN INCORPORATION-BY REFERENCE OF THE MATERIAL ON THE COMPACT DISC)

Not applicable.

BACKGROUND OF THE INVENTION

1. Field of the Invention

The invention described herein relates to publication of media content through a computer network.

2. Related Art

The popularity of the World Wide Web ("Web") and services provided on the Web has increased the demands placed upon Web sites. Server farms made up of a number of servers are sometimes used to provide computing power for a Web site. The load capacity on a single Internet Protocol (IP) based application server such as a Web server is often fixed. When a load upon a server reaches a certain level, performance of the server can degrade.

Therefore, given a server farm, load balancers can be used to distribute computing work load across different servers. FIG. 1 shows an example conventional load balancer 100 coupled to a server farm 110. Server farm 110 has multiple Web servers 120, 130 and 140. Load balancer 100 processes requests made by Internet users 105. Load balancer 100 is manually configured with a list of candidate Web servers 120-140 in a given pool, each with their respective resources. Load balancer 100 can then distribute client requests in a round-robin fashion among the available Web servers 120-140.

Load balancer 100 has a number of limitations. First, load balancer 100 does not discriminate among requests. All requests are handled equally regardless of whether a particular request involves more complex computing or a higher workload, relative to other requests. Treating a high workload request in the same manner as a low workload request can create an imbalance across servers. Second, load balancer 100 can manage multiple unrelated pools of servers, but is not aware of the data flow between pools of servers. This hampers load management. Third, the configuration needed in load balancer 100 can make it difficult to retire or reassign servers frequently or automatically. Operator intervention may be required, since the retiring or reassignment of a server must generally be carefully synchronized with changes on the load-balanced machines.

Load balancer 100 generally has a limited fault tolerance, based only on server availability. Load balancer 100 may perform a TCP-level check on the availability of Web servers 120-140 and distribute requests to available Web servers. This distribution (based on availability) is fairly crude and does not take into account whether an available server can provide a useful service in light of a particular task.

Conventional load balancers are generally limited by a lack of understanding of higher layer operations being carried out by servers. For example, many conventional load balancers work at a transport layer (OSI Layer 4) using TCP. At this layer, a load balancer can only determine that a server is willing to accept a connection, but not whether the server can satisfy a given request sent on that connection.

Moreover, a request from a user may not require the attention of a server in farm 110. Alternatives may exist for the satisfaction of a user request. A server external to farm 110 may best be able to handle the request, for example. Alternatively, a request for data could be handled by reading the requested data from a memory unit, such as a cache, and delivering the data to the user. In either of these cases, the processing of one of the servers 120-140 is not necessary.

Therefore, a need exists for a system that can intelligently process a user request, either by directing the processing of the request to one of a set of servers so as to effectively balance the load among the servers, or by directing the processing of the request to an appropriate alternative means for satisfying the request.

SUMMARY OF THE INVENTION

The inventors have recognized that limitations in conventional load balancers make them unsuitable for handling certain tasks, particularly those related to on-demand media transcoding. Transcoding servers and distribution servers that carry out on-demand media transcoding and publication involve complex server resources that require sophisticated balancing of transcoding tasks on the fly. What is needed is a method and system for intelligently processing a user request for media content, either by directing the processing of the request to one of a set of transcoding servers so as to effectively balance the load among the servers, or by directing the processing of the request to an appropriate alternative means for satisfying the request.

The present invention is directed to a system, method, and computer program product for publishing transcoded media content in response to publishing service requests from end users. The topology of the system is illustrated generally in FIG. 2. A network 201 (such as an intranet or the Internet) connects an end user 215 to a publishing service farm 210. The publishing service farm 210 receives a publishing service request from a client machine of end user 215. The publishing service request identifies the desired media content and can include, but is not limited to, one or more of the following constraints: formats supported by the client, bit rate of the client connection, client player version, client locale (country of residence), client native language, requested height and/or width of a display window (e.g. 320×240 pixels), etc. Publishing service farm 210 processes a publishing service request by arranging and executing the delivery of the desired media content. This can include transcoding of the media content into a format usable by the intended destination client. The destination client can be that of the original end user 215; alternatively, the destination client can be that of another user.

Note that the requested content originates as source media content from an origin server of a publisher such as CNN (publisher 217) or PBS (publisher 225). At the time of a publishing service request, the source media content may or may not reside at a publisher's origin server. The source media content may reside at a server at publishing service farm 210 at the time of the request, or may reside somewhere else reachable by publishing service farm 210.

Source media content can be any digital media content including but not limited to audio, video, streaming video, streaming audio, movies, video clips, playlists, pointer files, metafiles, HTML pages, etc. Transcoded media is media content that has been transcoded from a source format into a destination format suitable for a client of end user 215. The publishing service farm 210 can, as necessary, perform this transcoding of the source media content. In one example, not intended to limit the scope of this invention, the source media content would have the following properties:

video encoding: MPEG2,
audio encoding: MPEG2,
data rate: 1.6 megabits per second,
image size: 320×340 pixels,
video content: talking head,
audio content: voice.

The destination format would have the following properties:

video encoding: windows media 8,
audio encoding: windows media 8,
data rate: 300 kilobits per second,
image size: 160×120.

In particular, as shown in FIG. 3, a publishing service request processor 310 at publishing service farm 210 receives a client's publishing service request and generates an associated media provider request. A media provider farm 330, also at publishing service farm 210, receives the media provider request from the publishing service request processor 310 and arranges for publication of media content to fulfill the media provider request.

In an embodiment of the invention, the media provider farm 330 comprises a media provider request processor 340, a plurality of transcoding servers 350, a plurality of distribution servers 360, and a cache memory 370. The publishing service request processor 310 generates a media provider request to media provider request processor 340 in the media provider farm 330. The media provider request specifies one of several types of processing, depending on the media content requested, the constraints of the client, and resources available to the media provider farm. First, the media provider request can specify on-demand transcoding, in which source media content is transcoded by one of several transcoding servers 350 in the media provider farm 330, to produce the media content in the requested format. The transcoded media content is then sent to a destination client through a distribution server 360 in the media provider farm. Second, the media provider request can specify a cache access, so that previously transcoded media content, resident in the cache 370 in the media provider farm 330, can be used to fulfill the client's publishing service request. Again, the transcoded media content is sent to the destination client through a distribution server 360 in the media provider farm 330. Third, the-media provider request can specify pass-through processing, in which the requesting client is directed to an origin server (not shown) from which the requested media content can be provided directly.

An embodiment of the invention also allows for transcoding independent of any particular client or user. Here, a media provider request scheduler 320 creates and sends a batch media provider request to the media provider request processor 340, specifying the source media content to be transcoded and a format. Like a media provider request made in the on-demand mode, such a request generated in the batch mode can include, but is not limited to, one or more of the following constraints relevant to clients: client media format, bit rate of the client connection, client player version, client locale (country of residence), client native language, requested height and/or width of a display window (e.g. 320×240 pixels), etc. As in the case of on-demand transcoding, a transcoding server 350 transcodes the media content (obtained from an origin server) in the specified format. The resulting transcoded media content is then cached, in anticipation of future publishing service requests from end users.

When a transcoding task is to be performed in the media provider farm (i.e., in the on-demand and batch cases), the invention provides a process for selecting a transcoding server. The process seeks to select a particular transcoding server in a manner that balances the totality of ongoing transcoding tasks across all such servers. The process considers the processing load that will be created by the transcoding task and the current load being borne by each transcoding server. According to one embodiment of the invention, the media provider request processor has a detailed understanding of the application layer (OSI layer 7) including application(s) performed by each type of transcoding server. This understanding is used to allocate transcoding tasks such that the work of servers is balanced more effectively. For example, unavailable servers are culled more effectively. This in turn provides a better quality of service to the end user. According to a further feature, the media provider request processor can even understand and balance transcoding servers which do not implement an industry-standard protocol like HTTP.

In an embodiment of the invention, each transcoding task is assigned a priority that can be based, for example, on the number of viewers seeking the associated media content. A higher priority transcoding task will displace a task of lower priority. The lower priority task can be "killed."

Additional features and advantages of the invention will be set forth in the description that follows, and in part will be apparent from the description, or may be learned by practice of the invention. The objectives and other advantages of the invention will be realized and attained by the system and method particularly pointed out in the written description and claims hereof as well as the appended drawings.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

Figure 1:
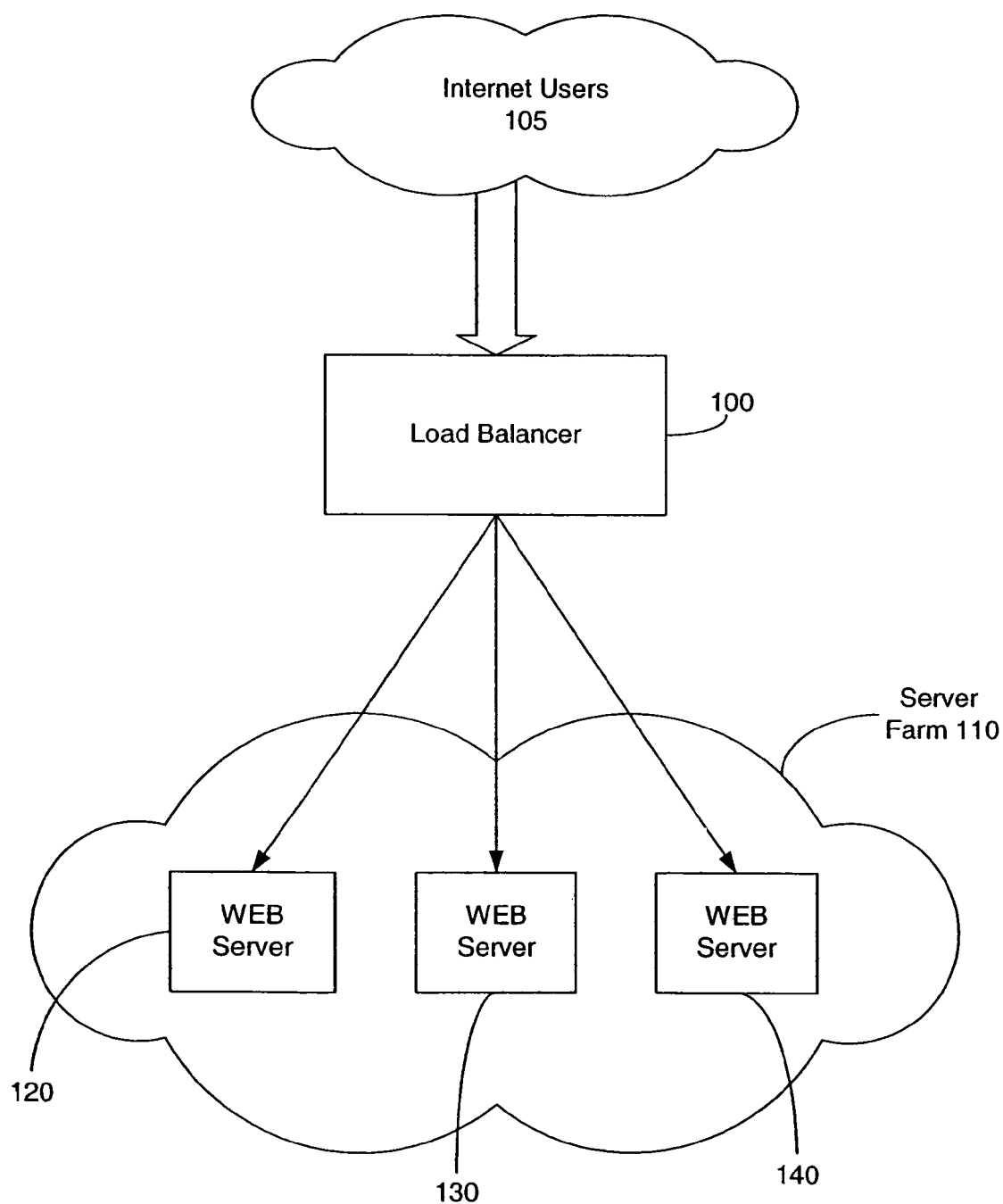
FIG. 1 illustrates the operation of a conventional load balancer.

Table of Contents
I. Overview
II. System
   A. On-demand
   B. Cache
   C. Pass-through
   D. Batch
   E. Intelligent Publishing Agent and Load Monitors
   F. Environment
III. Process
   A. On-demand and Cache Processing
   B. Pass-through Processing
   C. Batch Processing
   D. Determining Type of Media Provider Request
   E. Estimating Task Load
   F. Estimating Server Load
   G. Speculative Batch Processing
   H. Zero-Downtime Reassignment of Servers to Different Tasks, Fault Tolerance, and Zero-Downtime Server Retirement
IV. Data
V. Conclusion
I. Overview The invention described herein is a system, method, and computer program product that allows an end user to access media content across a network. In particular, the invention accepts a request from the user's client machine and sends the requested media content to a destination client in a format that is usable in light of the destination client's configuration. Note that the requesting client and the destination may or may not be the same machine. The requested media content in its original form (denoted herein as source media content) may be of a different format than what is desired or required by the end user. In this situation, the source media content is transcoded, by transcoding servers, into a format usable by the user at the destination client. In some situations, the requested media content will have already been transcoded and stored in a cache. In such a case, the already transcoded media content is simply distributed to the client. In other cases, if the source media content is already in an appropriate format for the end user, the transcoding process will effectively be bypassed, so that the client is simply directed to the origin server on which the source media content resides.

Source media content may originate from a storage device or another distribution server. The storage device or server may reside at any network location reachable by the transcoding servers. For example, the storage device or server may be housed in the same facility as the transcoding servers, or it may reside elsewhere on the Internet. The source media content may be stored (pre-recorded), or it may consist of live content being digitized as it is being distributed.

One or more transcoding servers can be used to transcode source media content into a format usable by the user at the destination client. The invention includes a process by which the load placed on the transcoding servers is generally balanced. This facilitates efficient usage of available transcoding capacity. In an embodiment of the invention, transcoding tasks can be prioritized, so that more important transcoding tasks are performed, while less important transcoding tasks are deferred or killed.

In some situations, it may be desirable to allow some variants of the constraints that would otherwise be placed on a transcoding task. Such constraints include those related to the format requested or required by a client. "Loosening" these constraints may allow a faster or more efficient completion of a transcoding task. This would then allow a faster response to the end user. Relaxing the constraints may also allow delivery of the media content in a superior format than what was requested. Moreover, if transcoded media content is already available in cache memory, such content may be provided to the client even if the format of such material does not exactly match that specified by the requesting client.

As described in this section, and as will be seen in greater detail below, a number of options exist as to how a user's request for media content can be filled. It is a feature of this invention, that, given a request from an end user, all options are evaluated and an appropriate response is made in light of the request and the resources available for fulfilling the request.

Figure 2:
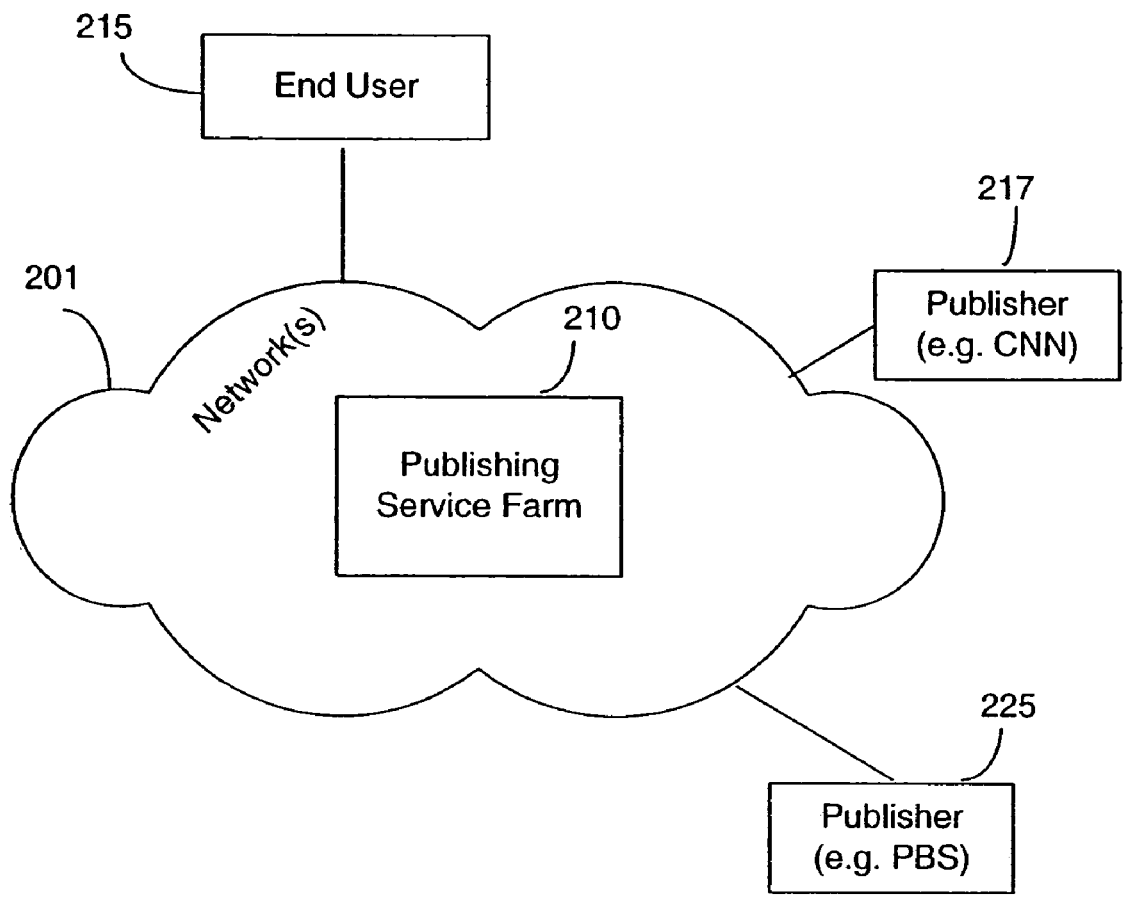
FIG. 2 illustrates the general system of an embodiment of the invention.
Figure 3:
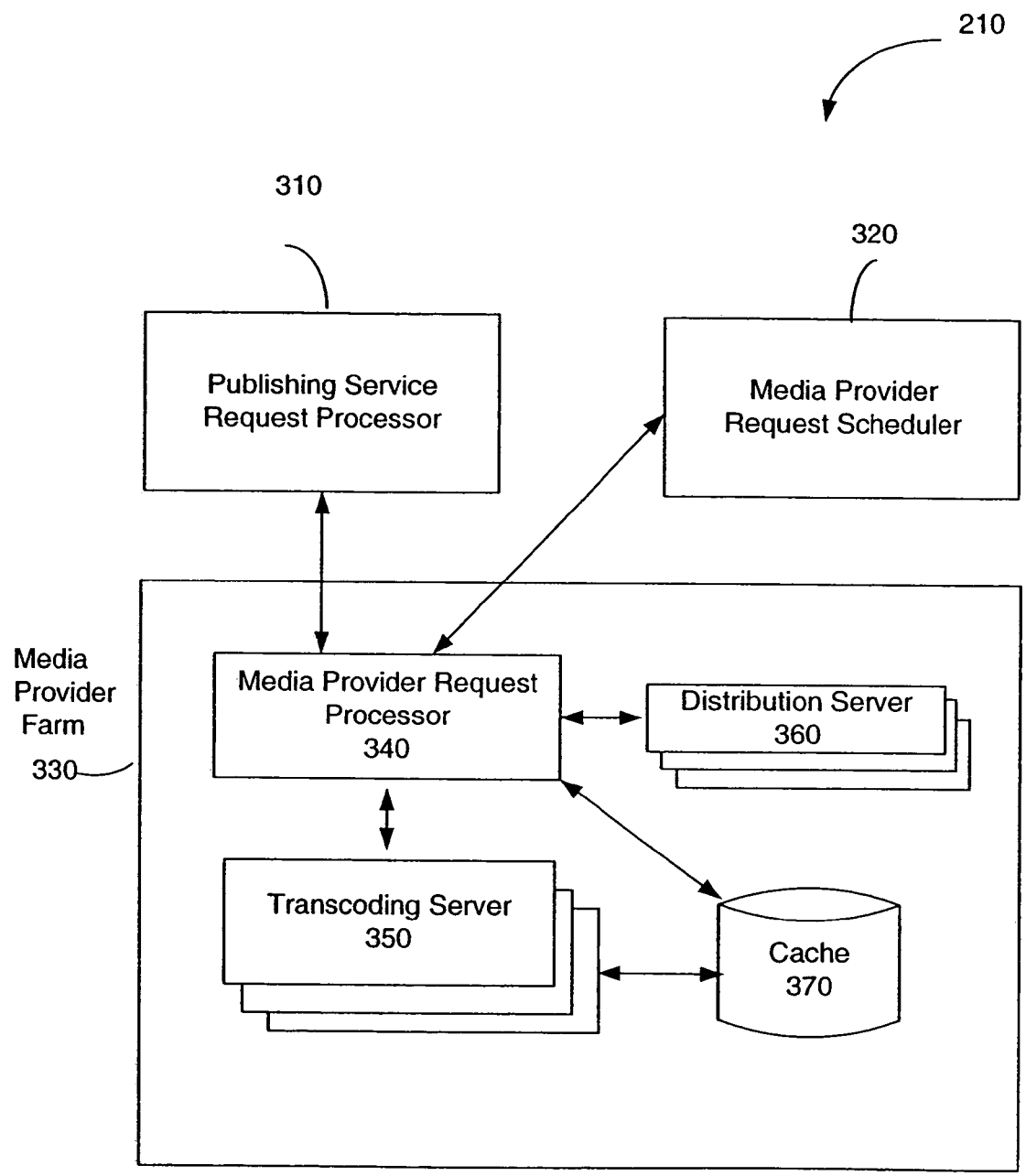
FIG. 3 is a block diagram illustrating a publishing service farm, according to an embodiment of the invention.

The invention is illustrated generally in FIG. 3. This illustrates the publishing service farm 210 introduced above in FIG. 2. A client's request for media content is first received by a publishing service request processor. 310. A request from the client, known hereinafter as the publishing service request, contains information about the specific media content desired and can also contain information about the configuration of the client. Alternatively, publishing service request processor 310 can receive information about the client's configuration during separate communications associated with the publishing service request. The publishing service request processor 310 is also aware of the resources that can be brought to bear in fulfilling the publishing service request. These resources can include, for example, the availability of transcoding capacity, and the availability of the requested media content in an already transcoded form. Based on the information pertaining to the client's configuration and on information pertaining to resources available, publishing service request processor 310 decides how best to fulfill the publishing service request.

Publishing service request processor 310 may, for example, determine that source media content needs to be obtained from an origin server and transcoded. Publishing service request processor 310 may alternatively decide that the requested transcoded media is already available, and in storage within publishing service farm 210. In this case, the requested transcoded media content would simply be read from memory and provided to the destination client. Publishing service request processor 310 can alternatively decide that the requesting client should be redirected to the origin server itself so that the desired media content can be delivered directly from the origin server.

The specific option identified by the publishing service request processor 310 is then conveyed in a media provider request to media provider farm 330. In particular, the media provider request is sent to media provider request processor 340. If the media provider request specifies that a transcoding task is to be executed in response to the client's request (i.e., "on-demand") than media provider request processor 340 initiates a transcoding task at one of several transcoding servers, such as transcoding server 350. As will be described in greater detail below, the selection of a transcoding server is based on the transcoding task and on the attributes of the assorted transcoding servers. These attributes include the available transcoding capacity on each transcoding server. In initiating a transcoding task, media provider request processor 340 will also consider the load that the transcoding task is expected to create on a transcoding server. An effort is made to select a transcoding server such that the total processing load across all servers is generally balanced. In addition, the priority of the transcoding task can also be a factor, in that a task of higher priority will be allocated to the transcoding server best able to execute the transcoding task in a timely manner. In an embodiment of the invention, a higher priority transcoding task can displace a lower priority transcoding task in a manner described in greater detail below.

If the media provider request sent by publishing service request processor 310 specifies that the media provider request is to be fulfilled by media content that has already been transcoded, media provider request processor 340 accesses the already transcoded media content from a cache memory 370. Such transcoded media content can then be sent to the destination client. Cache 370 is used to service requests that would otherwise consume transcoding resources. To facilitate access, the client constraints used to create the cache entry are associated with each cache entry.

All transcoded media that is provided by media provider farm 330 to the client is distributed to the client through one of several distribution servers, such as distribution server 360. This applies to media content that has been accessed from cache 370 or media content that has been transcoded by one of the transcoding servers. Distribution is initiated by a request from media provider request processor 340 to distribution server 360. The selection of a particular distribution server is based on availability and on the type of delivery service required. For example, in some cases a hypertext transfer protocol (HTTP) server is appropriate; in other cases, a RealServer (RTSP protocol), Windows Media Server (MMS protocol), or QuickTime server (RTSP protocol) is appropriate. Distribution server 360, which can be a streaming or download server, serves transcoded media content by either streaming it or downloading it to the destination client or to another distribution server. Examples of distribution processes include, but are not limited to, RealNetworks Real audio/video streaming, Apple QuickTime audio/video streaming, Microsoft Windows Media audio/video streaming, shoutcast/MP3 streaming, and HTTP downloading of RealNetworks, Microsoft, QuickTime, or Generic Media gMovie player movie files.

Media provider request processor 340 can also accept media provider requests from media provider request scheduler 320. Scheduler 320 acts autonomously from any particular client. Such a request from media provider request scheduler 320 can be viewed as a pre-encode batch media provider request. Based on such a request, media provider request processor 340 initiates a transcoding task, resulting in transcoded media content that is then stored in cache 370. This results in the ready availability of transcoded (pre-encoded) media content in media provider farm 330, so that future publishing service requests can be handled without transcoding on-demand.

II. System

The system of FIG. 3 will now be described in greater detail with respect to possible operating modes. This section describes the various logical components of the invention and their connectivity. The processing that takes place within and between the components is described only briefly, in order to explain the structure of the invention. A more detailed discussion of the processes of the invention is presented in section III.

A. On-Demand

Figure 4A:
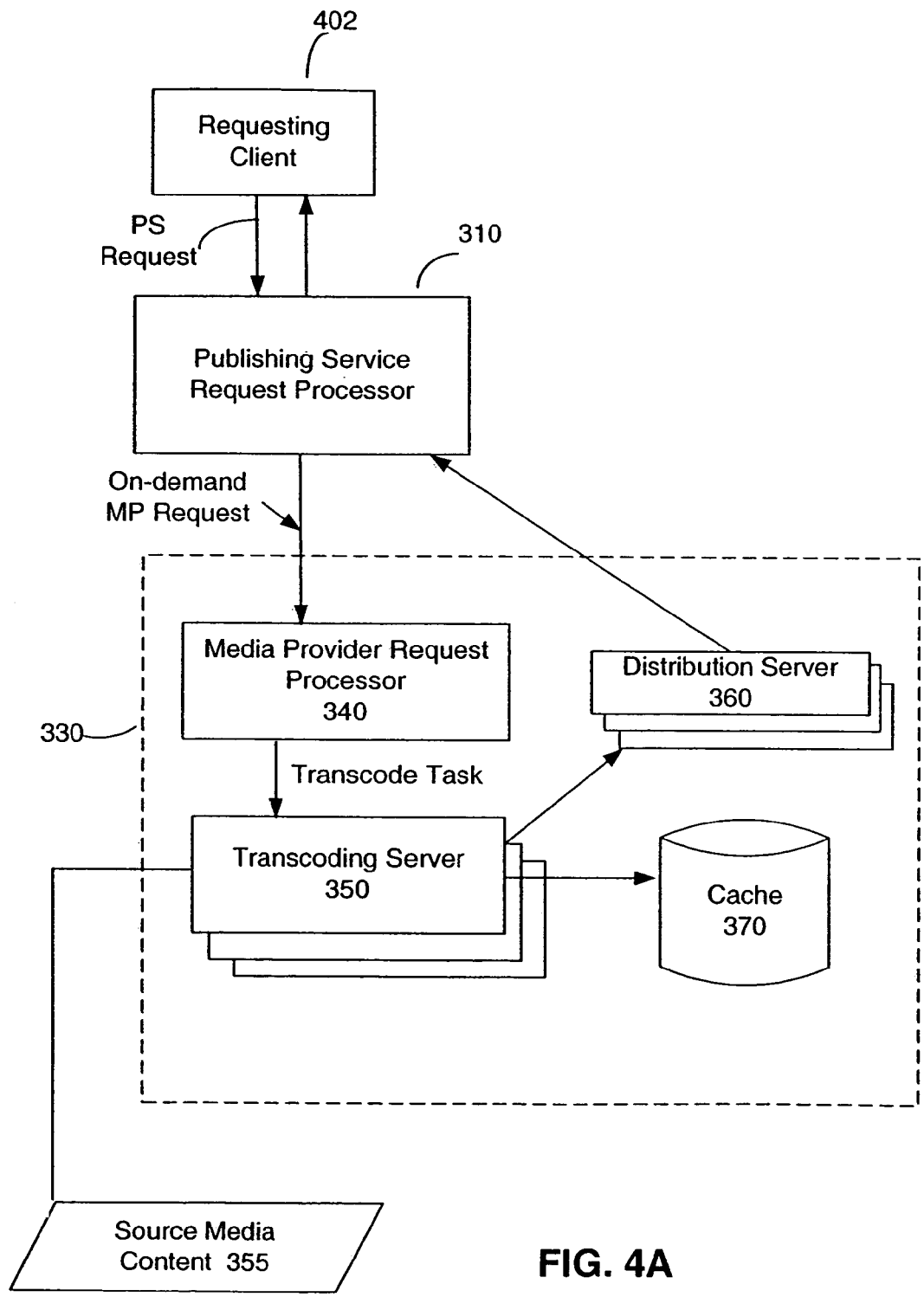
FIG. 4A is a block diagram illustrating the system of the invention as it processes an on-demand media provider request, according to an embodiment of the invention.

FIG. 4A illustrates the system of the invention as it processes an on-demand media provider request. A client 402 sends a publishing service request to publishing service request processor 310. Publishing service request processor 310 then sends a media provider request to media provider request processor 340. The media provider request in this example specifies an on-demand transcode. Media provider request processor 340 then initiates a transcode task at a transcoding server 350. Transcoding server 350 then accesses source media content 355. Source media content 355 is obtained from an origin server (not shown) on which source media content 355 resides.

Transcoding server 350 then performs the transcode task in a manner specified by the media provider request. The resulting transcoded media content is then sent to a distribution server such as distribution server 360. Note that in an embodiment of the invention, the transcoded media content is also sent to cache 370. This allows subsequent publishing service requests from client 402 or from any other client to be serviced by media provider farm 330 without having to repeat the transcode task. Distribution server 360 passes the transcoded media content to publishing service request processor 310, which forwards the transcoded media content to client 402, or to whatever client was specified in the publishing service request.

B. Cache

Figure 4B:
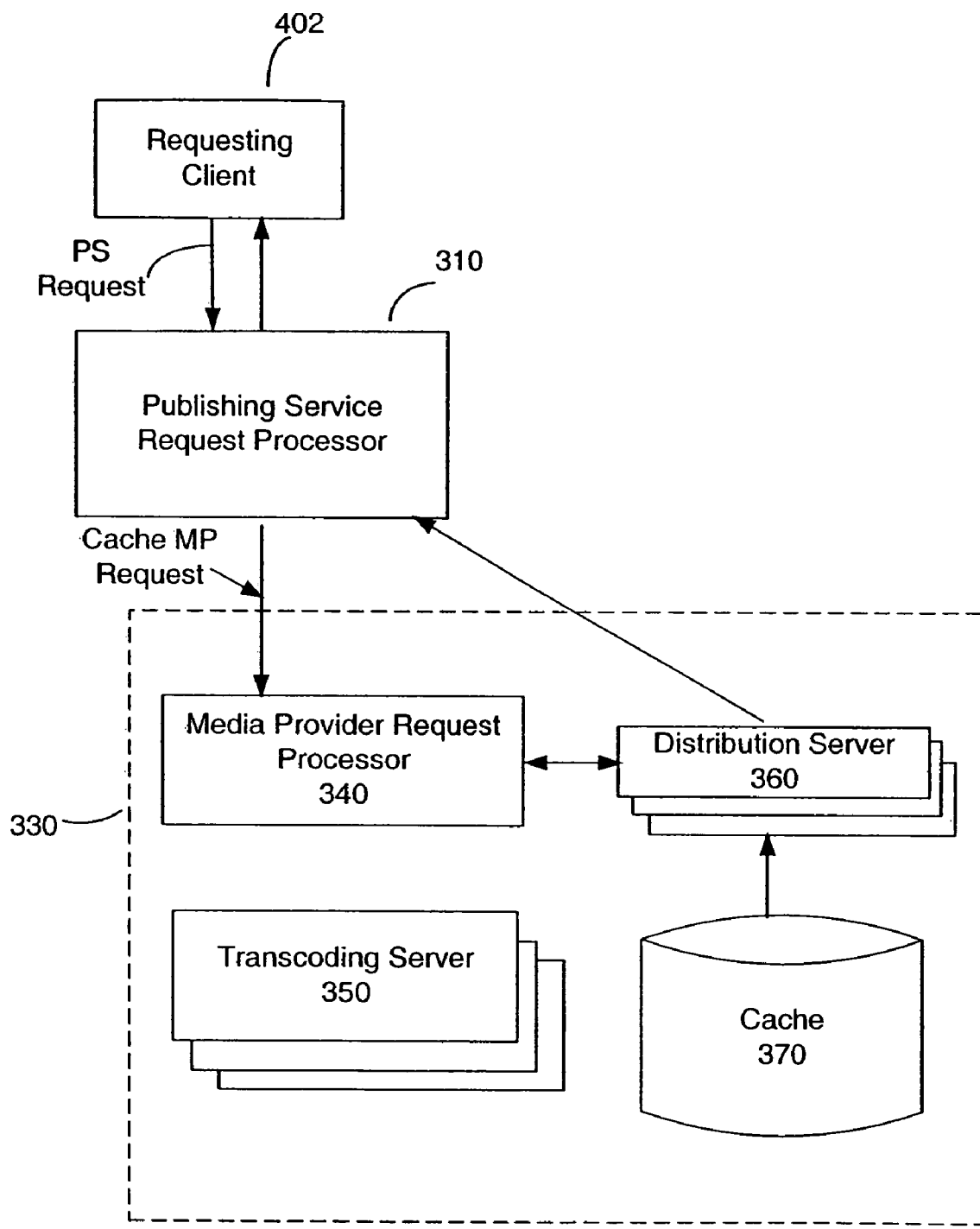
FIG. 4B is a block diagram illustrating the system of the invention as it processes a cached media provider request, according to an embodiment of the invention.

The system of the invention is illustrated in FIG. 4B processing a publishing service request through the use of cached media content that has already been transcoded. Here, client 402 issues a publishing service request to publishing service request processor 310. Publishing service request processor 310 then evaluates the publishing service request in light of what it knows about available resources. In particular, if publishing service request processor 310 knows that the requested media content is available in cache 370 then publishing service request processor 310 issues a media provider request specifying cache access. This media provider request is passed to media provider request processor 340.

Media provider request processor 340 then chooses a distribution server, such as distribution server 360. A distribution request is sent from media provider request processor 340 to distribution server 360, instructing distribution server 360 to distribute the requested transcoded media content from a specified file in cache 370 to the client. The transcoded media content is then read from cache 370 and forwarded to publishing service request processor 310 through the chosen distribution server 360. The requested content is then forwarded to client 402, or to whatever client was specified in the publishing service request.

C. Pass-Through

Figure 4C:
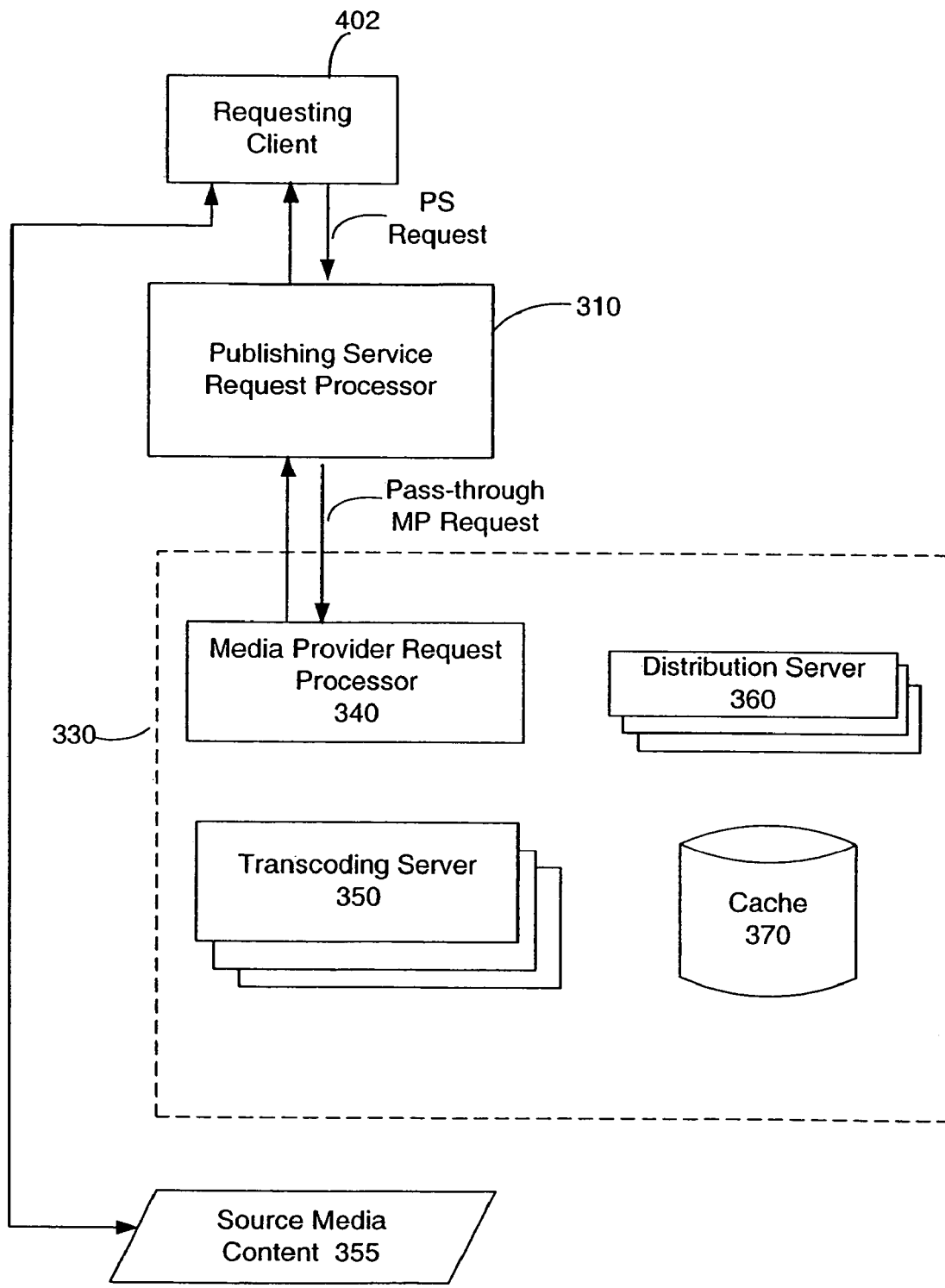
FIG. 4C is a block diagram illustrating the system of the invention as it processes a pass-through media provider request, according to an embodiment of the invention.

The system of the invention can also operate to direct a client to an origin server, from which the client can obtain the desired media content directly. This is illustrated in FIG. 4C. Here, as before, client 402 sends a publishing service request to publishing service request processor 310. Publishing service request processor 310 then determines that the publishing service request can best be served by an origin server (not shown) that can provide source media content 355. This results in a media provider request being sent from publishing service request processor 310 to media provider request processor 340. Such a media provider request specifies that the content is to be obtained by client 402 from an origin server directly. The media provider request processor 340 then directs the client's media player to the origin server.

D. Batch

Figure 4D:
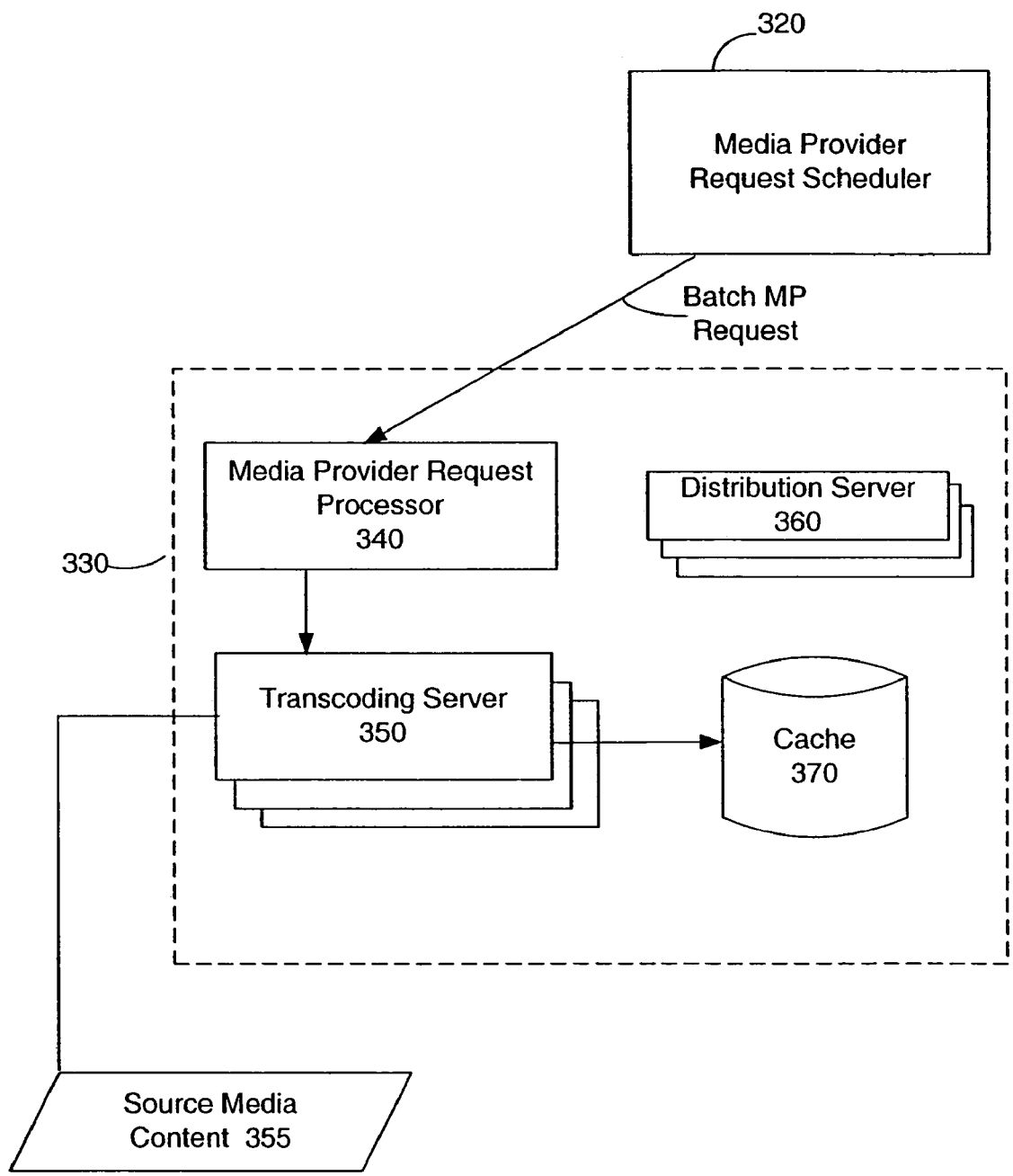
FIG. 4D is a block diagram illustrating the system of the invention as it processes a batch transcoding media provider request, according to an embodiment of the invention.

In addition, the system of the invention can also perform transcoding in anticipation of future client requests. This is illustrated in FIG. 4D, and is denoted hereinafter as batch transcoding. Here, a media provider request scheduler 320, acting independently of any specific clients or end user, sends a media provider request to media provider request processor 340. This request specifies both the source media content to be transcoded and the format of the resulting transcoded content. The media provider request processor 340 then initiates a transcoding task at a transcoding server 350. Transcoding server 350 then accepts source media content 355 and performs transcoding. The resulting transcoded media content is stored in cache 370. The transcoded media content is then available for eventual distribution to requesting users via a distribution server such as distribution server 360.

E. Intelligent Publishing Agent and Load Monitors

Figure 8:
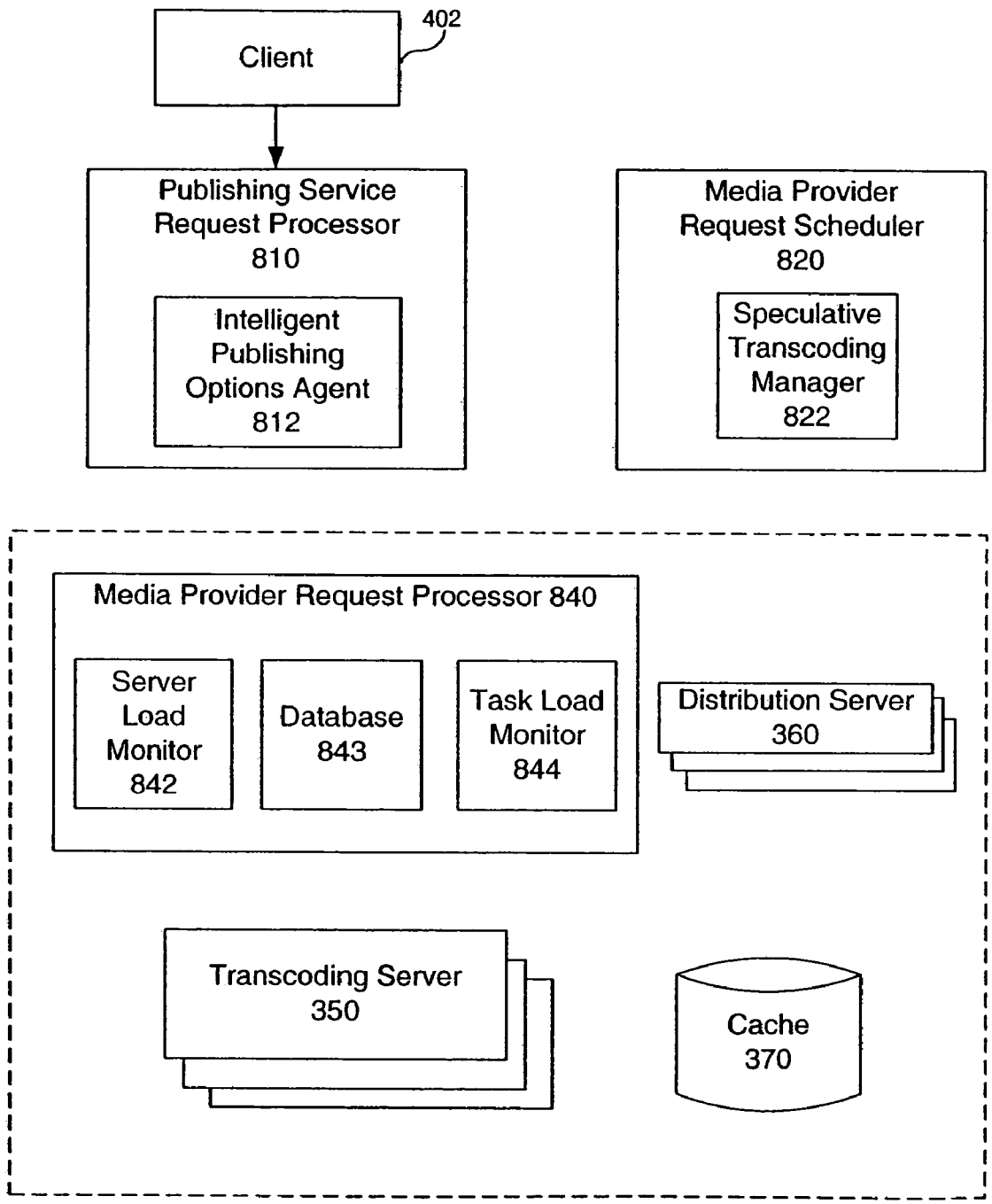
FIG. 8 is a more detailed block diagram of the system of the invention description, according to an embodiment of the invention.

The system illustrated in FIGS. 4A through 4D can be enhanced by a number of modules that facilitate the operation described herein. These enhancements are illustrated in FIG. 8. In this embodiment, publishing service request processor 810 includes an intelligent publishing agent 812. This agent considers the utility of the various ways in which a given publishing service request can be handled. Agent 812 will evaluate the utility of directing the client to an origin server, as illustrated in FIG. 4C for example. Agent 812 would also consider the utility of accessing cache 370 in order to fulfill the publishing service request. Alternatively, agent 812 may determine that transcoding, as illustrated in FIG. 4A, is appropriate. If transcoding is chosen, agent 812 will also decide if lower priority transcoding tasks need to be killed. Agent 812 will also decide whether some of the client constraints identified in the publishing service request can be ignored or modified.

A media provider request is then sent from publishing service request processor 810 to media provider request processor 840. If the media provider request specifies that transcoding is to be performed, then a transcoding task must be initiated at a transcoding server. To facilitate the allocation of the transcoding task to a particular transcoding server, the load to be placed on the transcoding server by the particular transcoding task must be evaluated. This is the job of the task load monitor 844. The nature of on-demand media transcoding is such that it is difficult to predict the load an individual task will put on the system. In the case of the transcoding servers, the load is a function of the source media content, requested destination format, and server hardware. Determining the resulting load is sufficiently complex that one cannot reliably compute it before the transcode begins. This is primarily due to the wide variety of source and destination properties that the transcoding servers collectively support. In addition, variations in server hardware amongst the transcoding farm servers (CPU clock speed, hard drive performance, hardware acceleration boards, etc.) make some servers more efficient than others at certain tasks (decodes or encodes of specific formats, color coordinate transformations, etc.).

Task load monitor 844 estimates task load by constructing a model of required load for a given request based on previous transcodes. Upon completion of any transcode, transcoding tasks record the source, destination, and server properties along with statistics on their load (e.g., average CPU load, maximum CPU load) into a database 843. During the server selection process, task load monitor 844 estimates the prospective load of a requested task by comparing source, destination and potential server properties with that of previous transcodes. If an exact properties match is found, the load of the previous matching transcode is used as the load estimate for the new task. If an exact match cannot be found, the closest properties match is used as the load estimate for the new task. In the difference calculation, certain properties are given more weight than others, as will be described below.

In addition, the current processing load on each of the transcoding servers (i.e., load value) must be considered. One aim of the present invention is to maintain an accurate load value for all servers, so that the media provider request provider 840 does not mistakenly overload or under utilize a server. This is the job of the server load monitor 842. Transcoding servers periodically report their load to the server load monitor 842. Between the time at which a task is allocated on a transcoding server and the time at which the server next reports an existing load that includes that task, it will appear to the media provider request provider 840 as if the new task has placed no load whatsoever on the server. One can imagine a scenario in which a task is assigned to a transcoding server, and the media provider request provider's load value for that server is not updated in a timely manner. The media provider request provider 840 may mistakenly assign more tasks to the server, eventually overloading it.

To overcome this race condition, server load monitor 842 tracks the state of new tasks and assigns an estimated load to tasks until they reach a mature, or running, state. During this time, server load monitor 842 calculates the server load as the measured current server load plus the load estimate for each of the newly allocated tasks on that transcoding server. Once the task has reached the mature, running state, a server handling the task updates its reported state to "running" to indicate that its load is accurately reflected in the returned measured server load. This has the effect of reserving a portion of the transcoding server for the new task until the task can start up and report its actual measured load, avoiding the race condition.

In the embodiment of FIG. 8, media provider request scheduler 820 includes a speculative transcoding manager 822. Manager 822 decides what source media content should be transcoded in batch mode operations. The volume and nature of publishing service requests is not constant. Even on a daily basis, the demand for content typically rises beginning in the late morning, peaks in the early evening, and descends into the morning hours. Speculative transcoding manager 822 takes advantage of otherwise idle farm time by speculatively transcoding content for later use.

The choice of which transcodes to perform speculatively can be motivated in several ways:

Speculative transcoding manger 822 can optimize farm efficiency by examining the record of previous transcoded formats, players, etc. and speculatively transcode media clips into those formats during off-peak times. In general this would allow a distributed on-demand media transcoding system to support the same quality and quantity of service with fewer transcoding servers.

Source content can be transcoded slower than real-time and thus at a higher quality level than possible during an on-demand transcode. In one business method according to the present invention, revenue can be increased by offering such encoding as an extra cost service to customers.

Source media content may also, for example, be transcoded to meet a schedule specified by a publisher.

F. Environment

Referring again to FIG. 2, a block diagram is shown representing an example operating environment of the present invention. It should be understood that this operating environment is shown for illustrative purposes only and does not limit the invention. Other implementations of the operating environment described herein will be apparent to persons skilled in the relevant art(s) based on the teachings contained herein, and the invention is directed to such other implementations.

The illustrated operating environment includes an end user 215, origin servers 217 and 225, a publishing service farm 210, and a network 201. Only one user and two origin servers are shown for clarity. In general, any number of these components can be included in the system of the present invention. Moreover, in FIG. 2 the origin servers are shown at a publisher's facility, external to publishing service farm 210. Note that in other environments of the invention, an origin server may be inside publishing service farm 210 or somewhere else reachable by publishing service farm 210.

The end user 215, the origin servers 217 and 225, and the publishing service farm 210 are all connected via a network 201. The network 201 connects all the components of the present invention, and can be any type of computer network or combination of networks including, but not limited to, circuit switched and/or packet switched networks, as well as wireless networks. In one example, the network 201 includes the Internet.

Any conventional communication protocol can be used to support communication between the components of the system. For example, a Transmission Control Protocol/Internet Protocol (TCP/IP) suite can be used to establish links and transport data and Real-Time Streaming Protocol (RTSP) can be used to stream data between components of the system. A World Wide Web-based application layer and browser (and Web server) can also be used to further facilitate communication between the components shown in FIG. 2. However, these examples are illustrative. The present invention is not intended to be limited to a specific communication protocol or application, and other proprietary or non-proprietary network communication protocols and applications can be used. The user 215, or viewer, uses a client machine to request media content via the network 201, and/or to play received media content. In embodiments of the invention, the destination client is a personal computer that includes a Web browser and one or more media players running under the computer operating system. Alternately, the destination client can be a WEBTV, a WINDOWS CE device, a Personal Digital Assistant (PDA), a PALM handheld device, a console appliance with network access capability, an MP3 appliance, or any other client device and/or program capable of requesting, receiving and/or playing media content. However, the invention is not limited to these examples, and one skilled in the art will appreciate that a wide variety of client devices and programs can be used to request, receive and/or play media content via the network 201. The invention is directed to such other client devices and programs.

The destination client is capable of receiving and playing various types of media content. For example, the user client may receive and/or play media content in various well-known encoded formats including, but not limited to, MPEG, AVI, MP3, REAL, WINDOWS MEDIA, QUICK TIME, H.263 video coding, and PALM-compatible formats.

The origin servers 217 and 225 are used by their respective content providers to publish and/or transmit media content over the network 201. An origin server can provide media content using a variety of media input devices and programs. For example, media content can be provided using cameras (8 mm, Hi-8, or any video digitizing device), line-in/microphone (either attached to any of the camera devices, or standalone audio input devices), digital cameras, devices that upload slide shows with voice-over illustrations, files previously encoded in a client-chosen format, or files available via a network accessible mount point (such as, but not limited to, Hypertext Transfer Protocol (HTTP), File Transfer Protocol (FTP), or remote servers). These examples are not limiting, and one skilled in the art will appreciate that a wide variety of client devices and programs can be used to publish and/or transmit media content via the network 201, and that the invention is directed to such client devices and programs.

An origin server is capable of publishing and/or transmitting various types of media content. For example, the origin server 217 can provide multimedia files in various well-known encoded formats including, but not limited to, MPEG, AVI, MP3, REAL, WINDOWS MEDIA, QUICK TIME, H.263 video coding, and PALM-compatible formats.

The publishing service farm 210 acts as an intermediate between the origin servers and the user client 215. As will be described in more detail below, the publishing service farm 210 receives requests for media content from the user client 215 and obtains the requested media content from an origin server. If necessary, the publishing service farm 210 then transcodes the media content received from the origin server from a source type to a destination type that can be accommodated by the user client 215, and delivers the transcoded media content to the user client 215 or other destination client. The publishing service farm 210 performs the transcoding and/or delivery of the requested media content in a manner that is transparent to the content provider as well as the viewer of the media content.

In accordance with the present invention, because the publishing service farm 210 can distribute media content in a variety of formats, i.e., destination types, the origin server can provide media content using a single media input device and still deliver the content to viewers using a variety of media players, each of which requires a different destination type. Additionally, the present invention permits users to access a variety of media content published in different source types no matter what media player they are using.

III. Process

A. On-Demand and Cache Processing

Figure 5A:
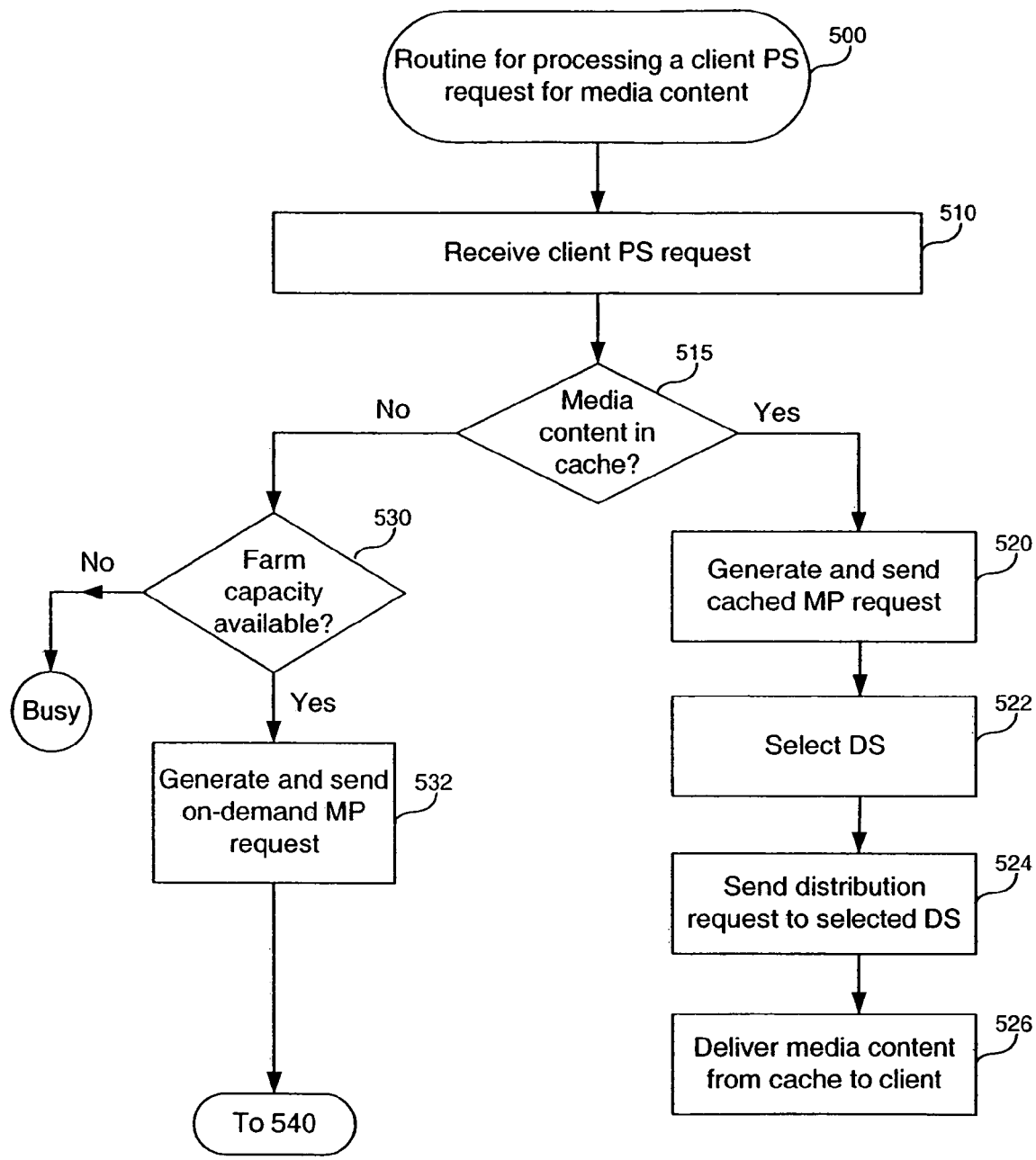
FIGS. 5A and 5B collectively illustrate the processing of a publishing service request by either cache access or on-demand transcoding, according to an embodiment of the invention.

One process for handling a client's publishing service request is illustrated in FIG. 5A. In step 510, the client's publishing service request is received at a publishing service request processor. Assuming that pass-through processing is not appropriate in this case, in step 515, the publishing service request processor determines whether the requested media is available in the cache memory of the media provider farm. If so, then in step 520, the publishing service request processor generates and sends a cached media provider request to the media provider request processor. The media provider request processor then selects a distribution server in step 522. In step 524, a distribution request specifying the desired content is sent to the selected distribution server. In step 526, the desired transcoded media content is delivered from the cache to the client via the selected distribution server. Note that in an embodiment of the invention, the transfer of transcoded media content from the cache to the client is pipelined, so that content is distributed to the client as it is transferred from the cache. In such an embodiment, it is not necessary, therefore, for the distribution server to receive all the requested content from the cache before starting distribution. Rather, distribution proceeds as the content becomes available at the distribution server, and as the rest of the requested content continues to be transferred from the cache.

Note that here, and in all other situations in which media content is distributed using this invention, the media content may be sent to a client other than that of the end user that originated the publishing service request. The receiving client will be specified in the publishing service request.

Figure 5B:
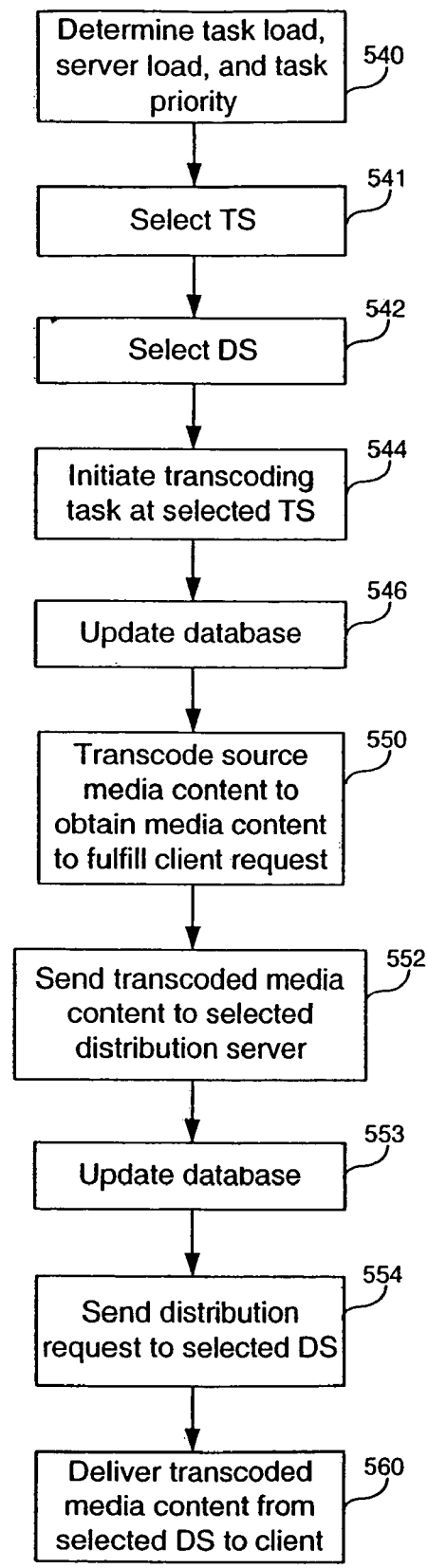

If, in step 515, the determination is made that the requested media is not available in cache memory, then processing continues at step 530. In this step, the publishing service request processor determines whether there is transcoding capacity available in the media provider farm. If not, then the end user is informed that the system is too busy to process the request. If, however, capacity is available, then processing continues at step 532. Here, the publishing service request processor generates and sends an on-demand media provider request to the media provider request processor. Referring to FIG. 5B, in step 540, the determinations are made as to the processing load inherent in the transcoding task, the current load on the transcoding servers, and the priority of the transcoding task. These determinations are described in greater detail below: In step 541, a specific transcoding server is selected by the media provider request processor. In step 542, the media provider request processor selects a distribution server. In step 544, a transcoding task is initiated at the selected transcoding server by the media provider request processor, directing the selected transcoding server to transcode and send its media content output to the selected distribution server. In step 546, a database is updated as to the status of the transcoding task. In an embodiment of the invention, this database resides at the media provider request processor and records the status and maturity of the transcoding task for purposes of informing subsequent decisions as to server selection. For an immature task, an estimate of the processing load of the task can be recorded at the database.

Note that in processing any given media provider request, the availability of transcoding servers must be determined accurately and unambiguously. If, for example, two media provider requests are being processed more or less simultaneously, there is a risk that each request would be unaware of the prospective processing load implied by the other. This could result in a resource contention problem, where each media provider request could lay claim to the same transcoding server. To prevent conditions such as these, database access must be controlled. In one embodiment of the invention, a media provider request is granted exclusive access to the database for purposes of determining server load (step 540) while other pending media provider requests wait. When the task and load associated with the first request have been assigned to a server, then the processing of another media provider request can begin by determining the current server load, etc. This and other mechanisms for preventing resource contention and database coherency problems are known to persons of skill in the art.

In step 550, the selected transcoding server transcodes source media content to obtain the media content that was requested by the client's publishing service request. In step 552, the resulting transcoded media content is sent to the selected distribution server. Note that in an embodiment of the invention, the transcoded media content is also sent to cache memory, where it is stored in the event that subsequent publishing service requests seek the same transcoded media content. In step 553, the database is updated to reflect completion of transcoding, and to record historical data relating to the transcode, such as processing load statistics, and source, destination, and transcoding server properties. This data can be used subsequently in estimating the load that will be required for future, similar tasks. In step 554, a distribution request is sent to the selected distribution server. In step 560, the transcoded media content is delivered from the selected distribution server to the destination client.

Note that steps 550 through 560 are shown in FIG. 5B as discrete events that occur in serial. In an alternative embodiment of the invention, these events are pipelined, so that as media content is transcoded, the transcoded media content is sent to a distribution server, while transcoding of the remaining source media content continues. It is therefore not necessary that the entire transcoding task finish before the transcoded media content is sent to the distribution server. Similarly, distribution can take place as transcoded content becomes available from the transcoding server. Distribution can proceed even as transcoded media content continues to be transferred to the distribution server. In another alternative embodiment of the invention, the transcoding server writes transcoded media content to the cache, and one or more distribution servers reads the transcoded media content from the cache as additional content is being generated.

B. Pass Through Processing

Figure 6:
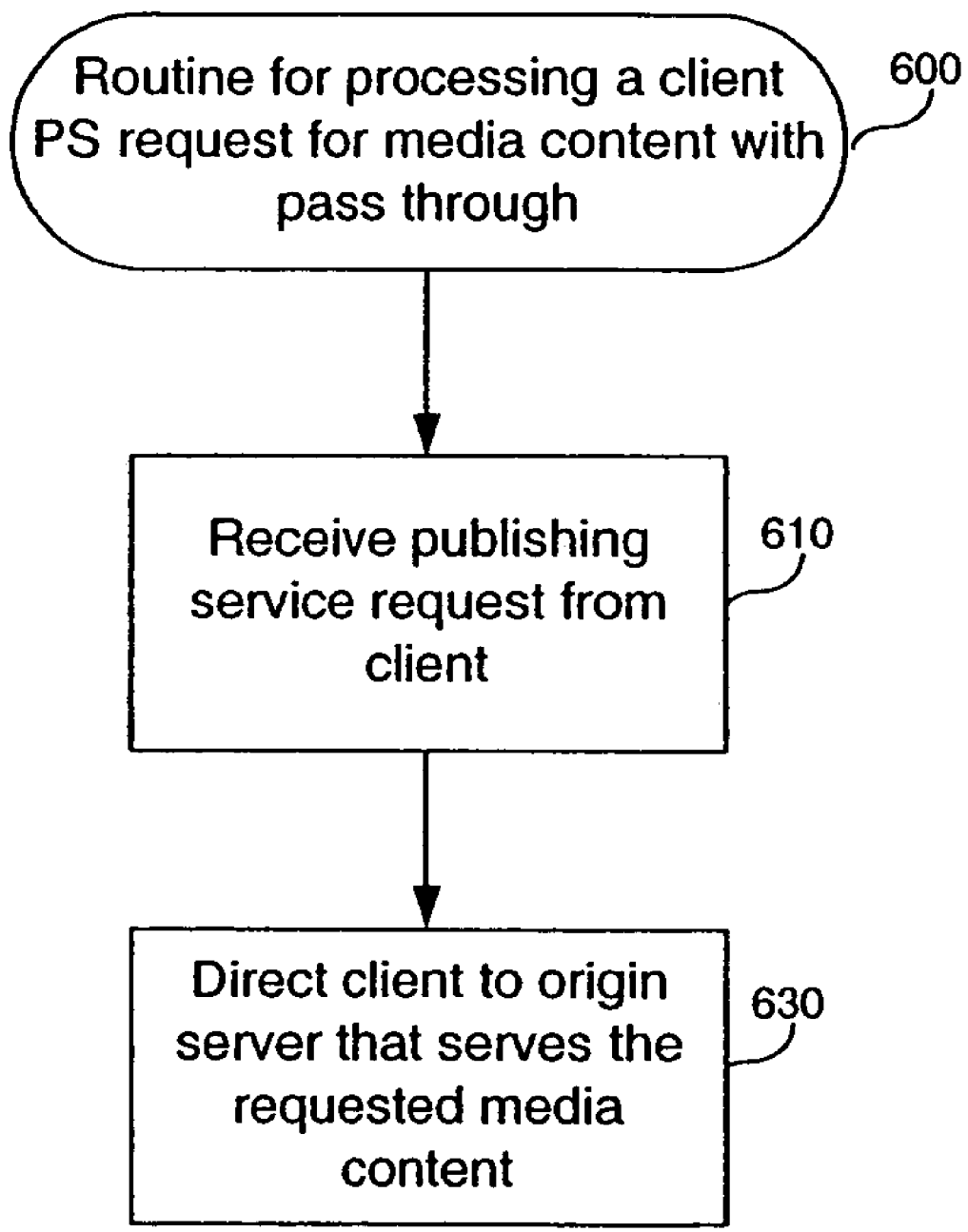
FIG. 6 is a flowchart illustrating the processing of a publishing service request by pass-through processing, according to an embodiment of the invention.

In the event that the publishing service request processor decides that the publishing service request should be handled in a pass through manner, the resultant processing takes place as illustrated in FIG. 6. In step 610, a publishing service request is received from the requesting client. In step 630, a corresponding media provider request is sent to the media provider request processor. As a result, the media provider request processor directs the requesting client to the origin server that serves the requested the media content.

C. Batch Processing

Figure 7:
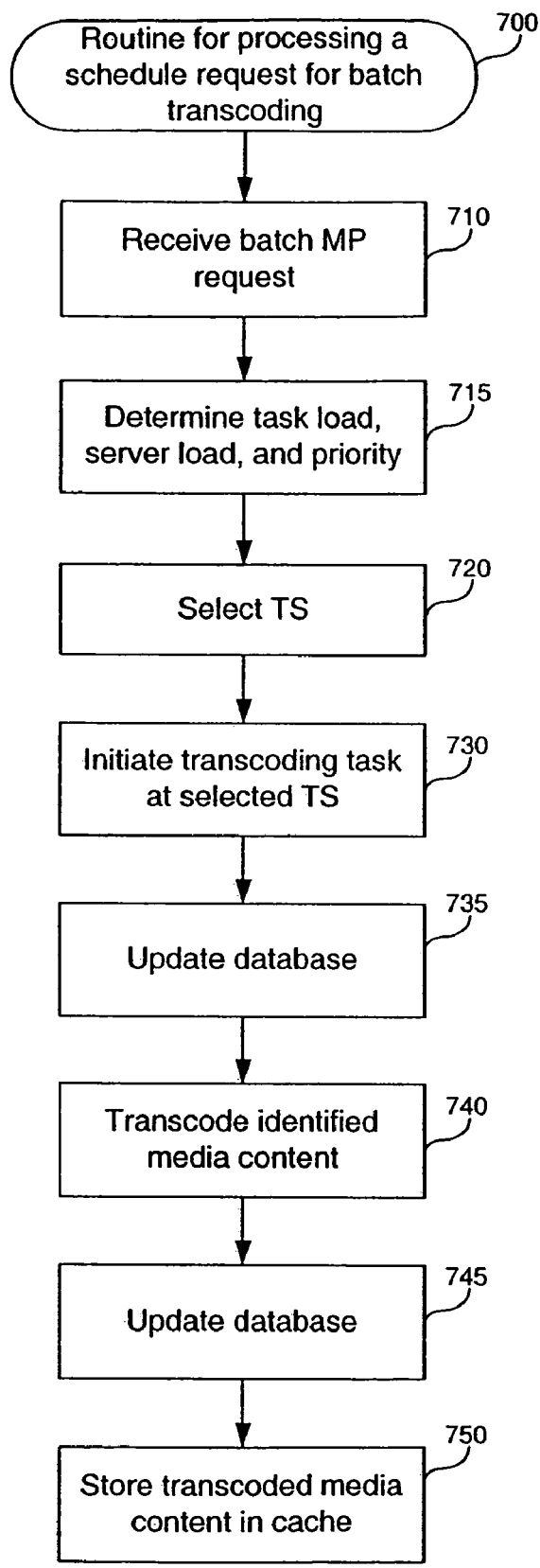
FIG. 7 is a flowchart illustrating batch transcoding, according to an embodiment of the invention.

As described briefly above, the invention can also perform batch transcoding independent of any particular client or publishing service request. The process for batch transcoding is illustrated in FIG. 7. In step 710, a batch media provider request is received at the media provider request processor from the media provider request scheduler. Note that in the illustrated embodiment, batch requests are made only when the necessary resources are available at the media provider farm. In step 715, determinations are made as to the processing load that the transcoding task will create at a transcoding server, the current load on the transcoding servers, and the priority of the task. In step 720, the media provider request processor selects a particular transcoding server. In step 730, a transcoding task is initiated at the selected transcoding server by the media provider request processor. In step 735, the database is updated as to the status of the transcoding task. In step 740, the selected transcoding server transcodes the media content identified in the media provider request. In step 745, the database is updated to reflect completion of transcoding, and to record historical data relating to the transcode, such as processing load statistics, and source, destination, and transcoding server properties. This data can be used subsequently in estimating the load that will be required for future, similar tasks. As discussed above, database coherency must be maintained, so that any process that accesses the database receives accurate information. For this reason, steps must be taken to ensure that updates to the database (e.g., steps 735 and 745) are completed before permitting any attempts to read the data. In step 750, the resulting transcoded media content is stored in cache memory. As described above, a publishing service request processor can generate any one of several media provider requests to the media provider request processor. Such a request, may specify pass through processing, cache access, or on-demand transcoding.

D. Determining Type Of Media Provider Request

Figure 9:
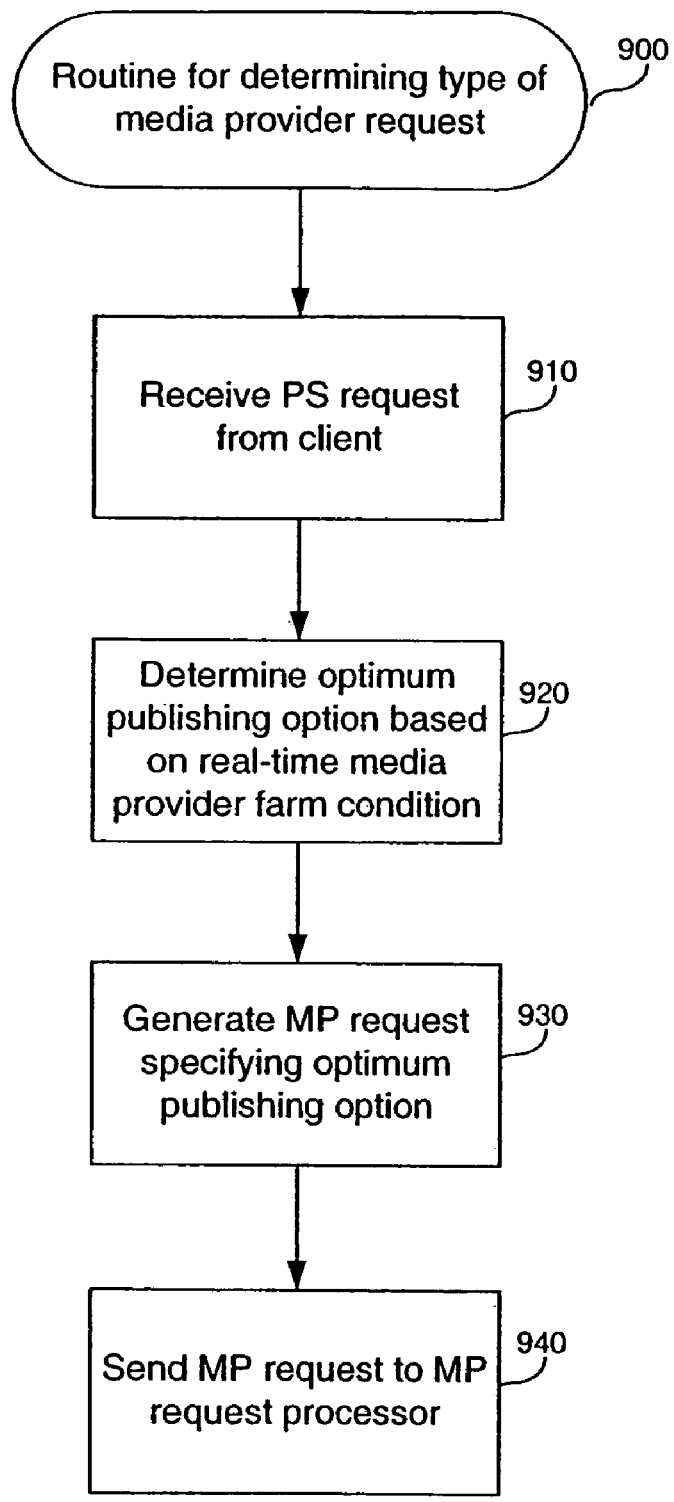
FIGS. 9 and 10 collectively illustrate determination of a publishing option, according to an embodiment of the invention.

The process of determining what kind of media provider request to generate (and, therefore, what kind of request processing to perform) is illustrated in FIG. 9. In step 910, the publishing service request is received at the publishing service request processor from a client. In step 920, the optimum publishing option is determined, based on real time information regarding the condition of the media provider farm and on the request itself. The relevant information on the condition of the media provider farm includes the availability of transcoding servers and the availability of the requested transcoded media in cache memory. In step 930, a media provider request is generated, specifying the optimum publishing option. In step 940, the media provider request is sent to the media provider request processor.

Figure 10:
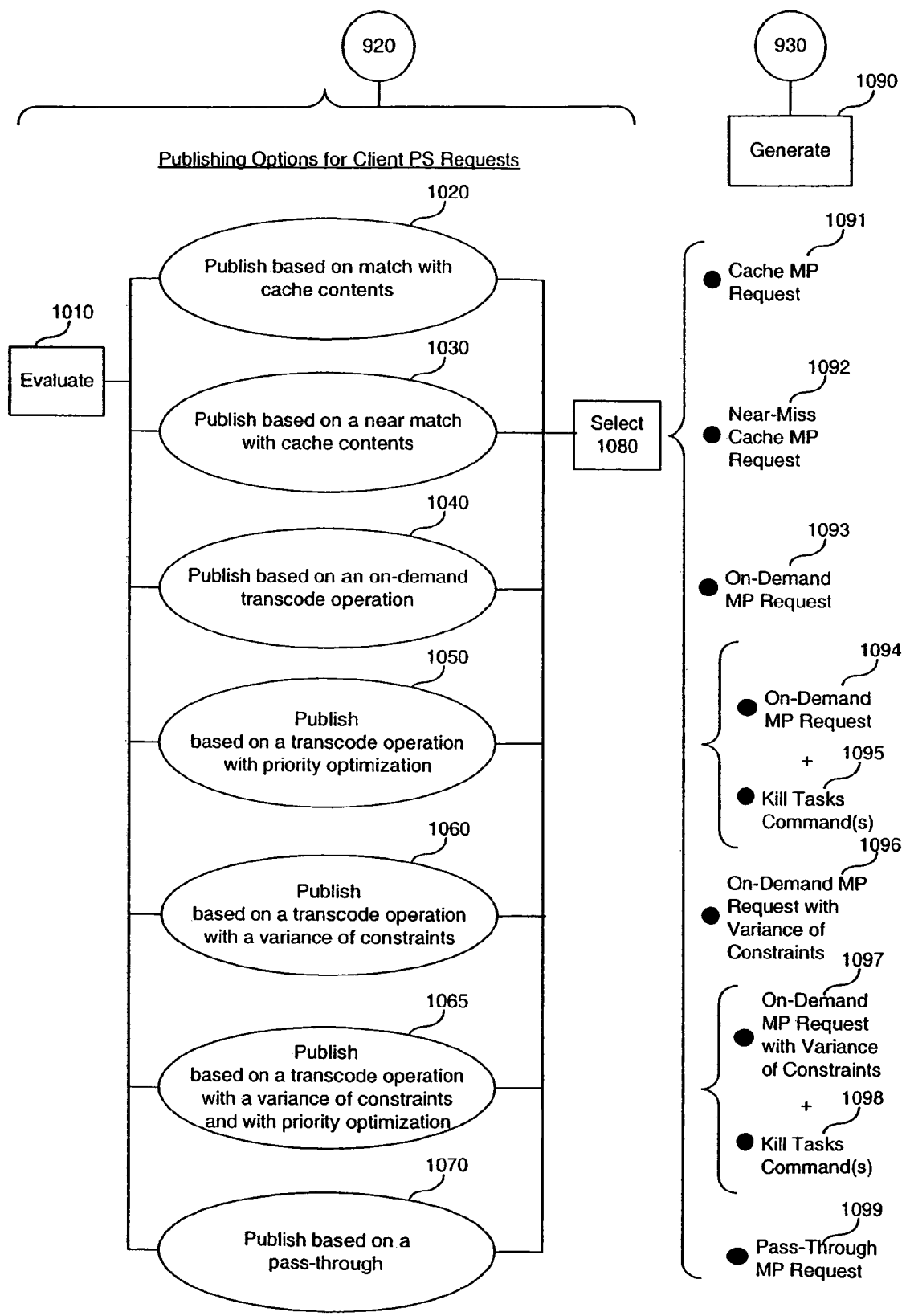

Steps 920 and 930, the steps of determining the optimum publishing option and generating the corresponding media provider request, respectively, are illustrated in greater detail in FIG. 10. With respect to step 920, an evaluation of step 1010 takes place, in which options 1020 through 1070 are considered. Option 1020 represents publication based on a match between the requested media content and cache contents. Option 1030 represents publication based on a near match between the requested media content and the cache contents. In this case, the requested media content is present in cache, but not in the requested format. If the format of the cached media content is close to what is requested, it may be more practical to distribute the cached content rather than perform a transcode.

Option 1040 represents publication based on an on-demand transcode operation wherein the transcoding matches the constraints identified in the publishing service request. Option 1050 also represents publication based on a transcode operation wherein the transcoding matches the constraints identified in the publishing service request. In option 1050, however, the transcode task has a certain priority that is then compared with the priorities of ongoing transcoding tasks. Option 1060 represents publication based on a transcode operation wherein the constraints identified in the publishing service request are varied, so that the originally identified constraints are not matched exactly in transcoding. Option 1065 also represents publication based on a transcode operation wherein the originally identified constraints are not matched exactly in transcoding. Like option 1050, however, option 1065 includes assessment of the priority of the transcoding task relative to other ongoing tasks. Option 1070 represents publication based on a pass through operation. In step 1080, the ideal option is selected.

With respect to step 930, generation of the appropriate media provider request is performed in step 1090; The generated request will be one of requests 1091 through 1099. Media provider request 1091 specifies cache access and corresponds to publishing option 1020.

Media provider request 1092 specifies cache access wherein the accessed media content represents a near match of the contents requested in the publication service request. Request 1092 corresponds to publication option 1030. When all attempts at scheduling new transcoding tasks have been exhausted it is possible, in this case, to respond to the client request with a piece of cached transcoded media that closely, but not exactly, matches the original request. Most users would rather see their request serviced with slightly modified constraints than not at all.

Here, existing cached transcoded media is sorted based on weight, where their weight is a function of their associated request constraint's variance from the client's original request constraints. More weight is given to constraints of greater importance, such as the source media content, player type, and player version. Less weight is given to constraints of less importance such as bitrate, height, width, etc. The cache entry of least weight variance is returned to the client. If the minimum variance is sufficiently large (e.g. no transcode of a particular source media within an acceptable variance could be found in the cache), option 1092 will not be chosen.

There may be some circumstances under which previously transcoded media content will be chosen, where the chosen media content does not exactly match the client's constraints, even when there is enough spare capacity to launch a new transcoding task that exactly matches the client's constraints. One example where this may occur is if previously transcoded media exists that has been transcoded in non-real-time as in the case of speculative transcoding operations; its quality may be so much higher than the real-time transcode that could be produced with an exact constraint match, that the previously transcoded media will provide an overall superior experience for the end user.

Returning to FIG. 10, media provider request 1093 specifies on-demand transcoding, and corresponds to publication option 1040. Media provider request 1094 specifies on-demand transcoding, wherein on-going transcoding tasks of lower priority can be killed to allow processing of the current transcoding task. The kill command 1095 is incorporated with request 1094. Request 1094, along with command 1095, correspond to publication option 1050.

Killing a task is based on priority. Each task is responsible for periodically updating its own entry in a table of tasks and respective priorities, providing both load and priority information. Task priority is determined by several factors including number of viewers (since content in high demand makes for a more urgent task) and contracted publisher uptime (since an obligation to publish also makes a task more urgent). Transcoding servers handling transcoding tasks actively modify a task's priority when the number of viewers changes. In the simplest case, a transcoding task whose viewer count has fallen to zero lowers its priority. If a new user joins, the server handling a task raises its priority.

Determination of which task(s) to kill is accomplished by iterating through the servers of the needed type until a server is found containing a set of lower priority tasks whose total load is less than the load estimate of the new task to be initiated. Once a server with a set of killable tasks has been identified, the media provider request processor sends kill message(s) to the identified killable tasks, then allocates the new task to the selected server. Note that the media provider request processor can kill tasks on transcoding and/or distribution servers, as needed.

In one example not intended to limit the scope of the invention, a transcoding task A is spawned in response to a request A. Initially it is assigned a priority of 1 because it has a single viewer. If, for example, the viewer disconnects, then the priority is lowered to zero to indicate lack of viewers. As task A proceeds, it reports an associated load of 50 units. Given a new task B with an estimated load of 40, the media provider request processor might then search for a transcoding server with a set of tasks of lower priority than B's priority, whose reported load is greater than or equal to 40. In this case, the media provider request processor will find that server A and task A satisfy its search. The media provider request processor reserves task B's estimated load on the server, then issues a kill command to task A, followed by initiation of task B at server A.

Media provider request 1096 specifies on-demand transcoding, wherein the constraints identified in the publishing service request can be varied. Request 1096 corresponds to publication option 1060. Such a media provider request may be appropriate, for example, when matching a requested format exactly is less important than a timely response. If, for example, none of the other options are feasible, then option 1096 could be the only alternative that satisfies the request. In the case of option 1096, the request is fulfilled in a slightly different format that what was requested. Alternatively, media content of a quality higher than what was requested may be provided. Again, matching the requested format exactly would be a secondary consideration. Note that by providing option 1096, system efficiency is enhanced, since the number of unique sets of constraints serviced by the system is reduced. This can allow the use of fewer transcoding servers by increasing the probability that a request can be handled by a cache.

In one example not intended to limit the scope of the invention, a transcoded task (with a requested bit rate of 300 k) has an estimated load of 80 units, but at most only 60 units of load are available on any particular transcoding server. In this case the media provider request processor could conform the estimate load to the available load by reducing the requested output bit rate from 300K to 128K. The media provider request processor next determines if this optimization is within the acceptable variance of the original request. In this case, reducing the output bit rate may not significantly reduce the user experience and, if so, is judged acceptable. Next, the task is initiated at the appropriate server.

Returning to FIG. 10, media provider request 1097, like request 1096, specifies on-demand transcoding, wherein the constraints identified in the publishing service request can be varied before transcoding. Media provider request 1097, however, is combined here with a kill tasks command 1098, similar to command 1095 described above. This combination corresponds to publishing option 1065.

Finally, returning to FIG. 10, media provider request 1099 specifies pass-through processing and corresponds to publication option 1070.

E. Estimating Task Load

Figure 11:
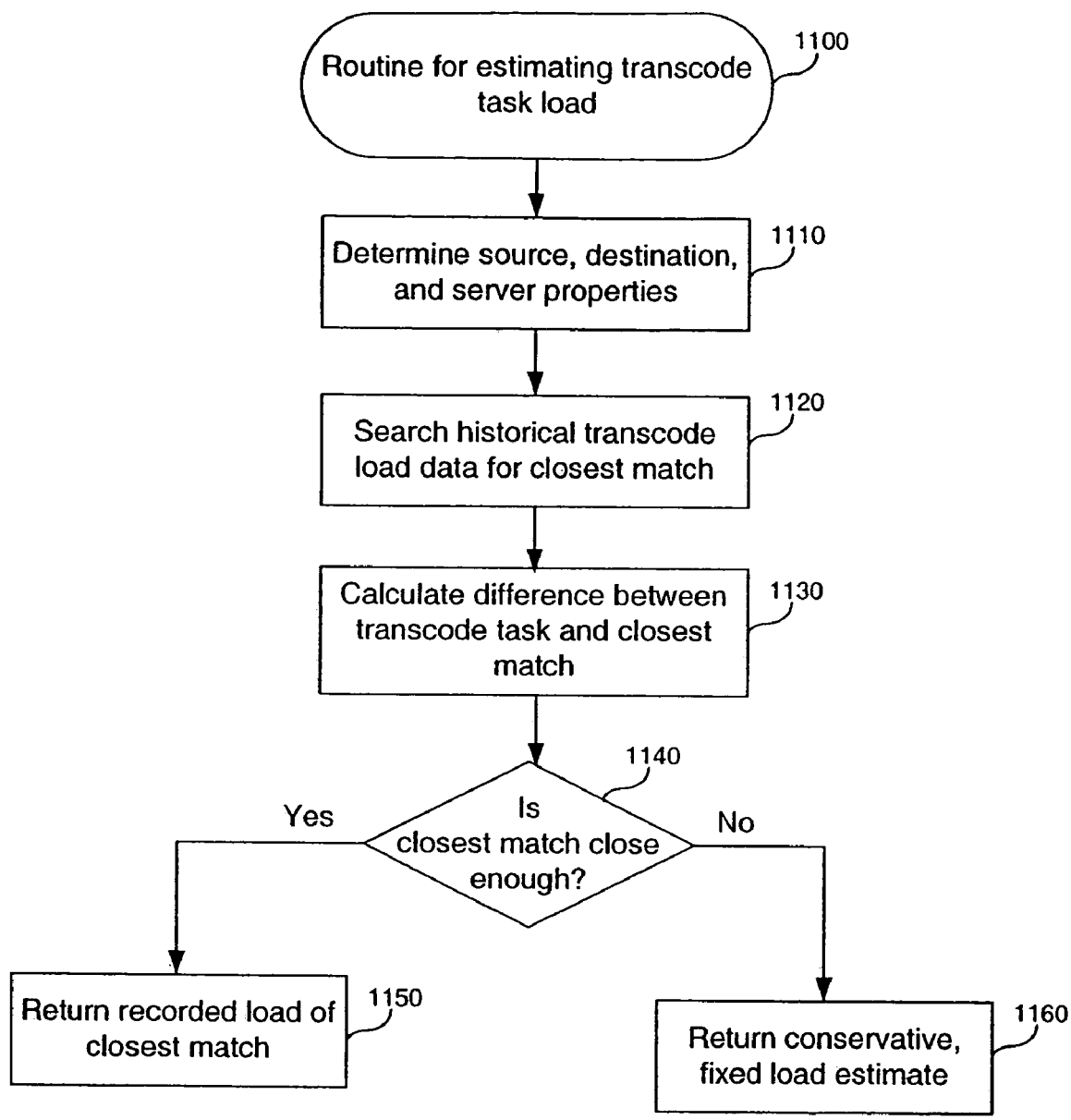
FIG. 11 is a flowchart illustrating estimation of task load, according to an embodiment of the invention.

As discussed above, the media provider request processor can comprise a task load monitor that estimates the processing load imposed by a given transcoding task. This estimation is necessary when determining which transcoding server will be assigned the task. The process for estimating the load associated with a transcode task is illustrated in FIG. 11. This process is performed with respect to each possible transcoding server. In this manner, the task's load is determined with respect to each server.

In step 1110, information is collected pertaining to the nature of the required transcode task. In particular, this information includes properties of the source and destination formats. This represents consideration of format of the source media content, and the format of the requested media content. Step 1110 also includes determination of transcoding server properties. This is necessary because the processing load created by a transcoding task depends in part on the properties of a prospective transcoding server.

In step 1120, a search is performed over historical transcode load data, in an attempt to find the closest match for the transcode task at hand with respect to source, destination, and server properties. In step 1130, the difference between the transcoding task at hand and the closest match is determined. If, in step 1140, the match is sufficiently close, then in step 1150, it is assumed that the load of the task at hand is approximately that of the closest historical match. The load of the historically matching task is therefore returned in step 1150.

If, in step 1140, the closest match is not sufficiently close to the task at hand, then in step 1160, a conservative, fixed, predetermined load estimate is returned.

In either case, the result of process 1100 is an estimate of the load that would be imposed by the task on a given transcoding server. After this process is performed with respect to all possible transcoding servers, and after current server loads are determined (see Section III. F. below), a decision can be reached as to the server to which the task should be assigned.

F. Estimating Server Load

Figure 12:
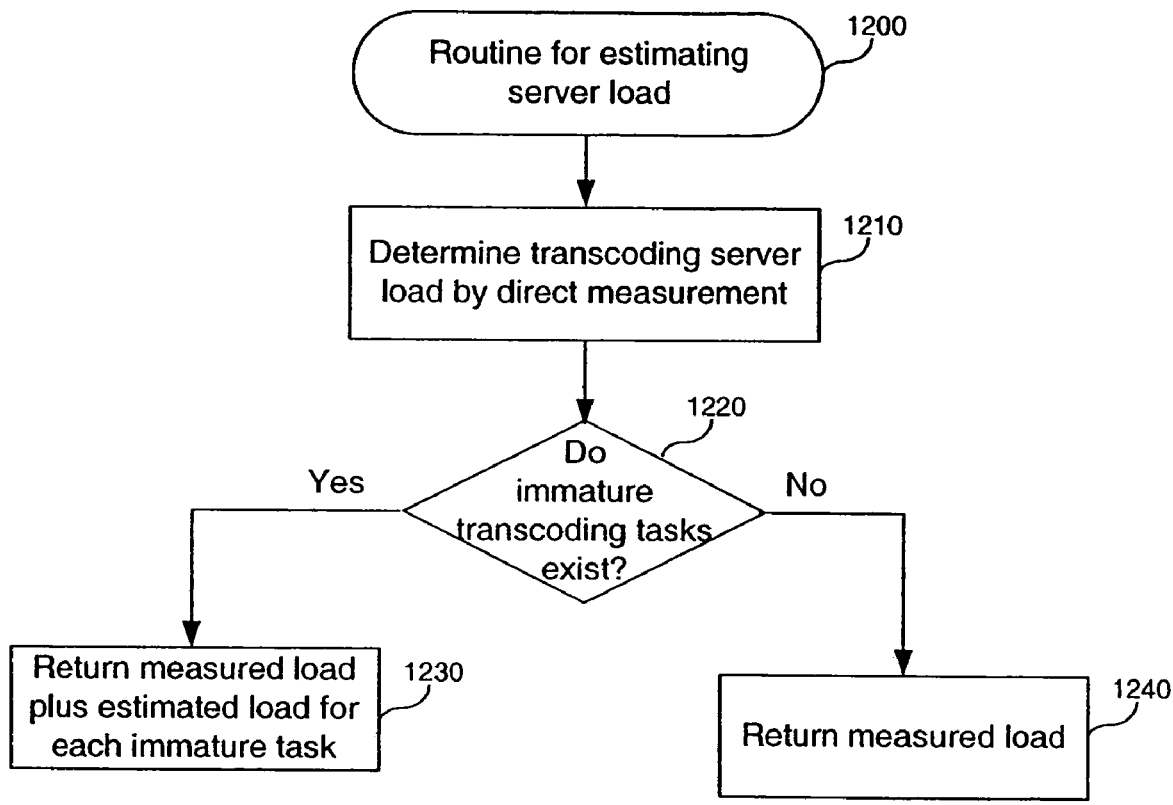
FIG. 12 is a flowchart illustrating estimation of server load, according to an embodiment of the invention.

The media provider request processor can also comprise a server load monitor for determining the current processing load on any given transcoding server. The process for this determination is illustrated in FIG. 12. In step 1210, the load on a transcoding server is determined by a direct measurement. In step 1220, a determination is made as to whether immature transcoding tasks exist at the server. Immature transcoding tasks represent tasks that have been initiated at a transcoding server, but are not yet using the processing capacity that they eventually will. If immature transcoding tasks exist, then, at step 1230, the transcoding server load is determined to be the measured load plus an estimated mature load for each as yet immature task. If, in step 1220, no immature tasks are found to exist at the transcoded server, then, in step 1240, the measured load is returned. In one example, not intended to limit the scope of this invention, the measured load would be expressed as a percentage of the available load. In the case of a Windows Media server, the load returned would be the current number of streams being served, divided by the maximum number of streams served. In the case of a transcoding server, the measured load could be expressed as the percentage of the server's total CPU capacity currently allocated to the transcoding tasks. In an embodiment of the invention, each immature transcoding task reports to the server load monitor when it has matured, i.e., when it starts using its maximum required processing capacity. In an embodiment of the invention, this reporting takes place via the database. As discussed above, database coherency must be maintained, so that any process that accesses the database receives accurate information. For this reason, steps must be taken to ensure that updates to the database are completed before permitting any attempts to read the data.

G. Speculative Batch Processing

Figure 13:
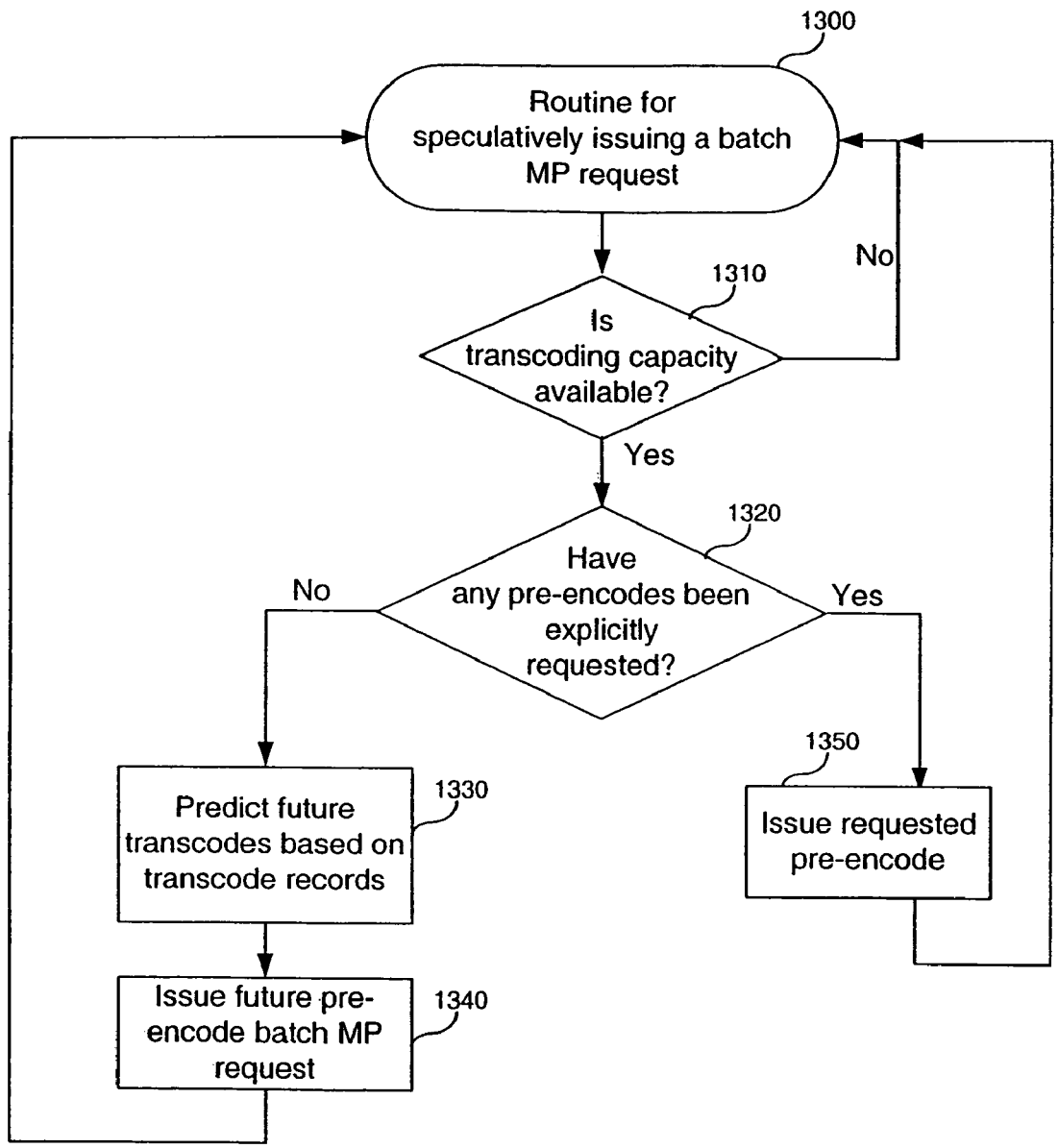
FIG. 13 is a flowchart illustrating speculative transcoding, according to an embodiment of the invention.

Also as described above, media provider request scheduler can include a speculative transcode manager. The process of speculatively issuing a batch media provider request is illustrated in FIG. 13. In step 1310, a determination is made as to whether transcoding capacity is available. In an embodiment of the invention, this determination comprises processes 1100 and 1200 described above. Process 1300 continues only if such capacity is present. In step 1320, a determination is made as to whether any "pre-encodes" have been requested. Publishers, for example, may request batch processing in anticipation of future publishing service requests; such publishers are therefore requesting "pre-encoding." Such requests can be queued at the media provider request scheduler. If pre-encodes have been requested, then in step 1350 a media provider request is issued, corresponding to the requested pre-encode. If, in step 1320, it is determined that no pre-encodes have been explicitly requested, then in step 1330, transcode records are reviewed in order to predict future transcode requests. In step 1340, a batch media provider request is issued based on the prediction of step 1330.

In one example not intended to limit the scope of this invention, the speculative transcoding manager would re-encode a previously real-time-transcoded content at slower than real-time in order to generate a higher quality output. Techniques employed to generate higher quality output could also include allowing more time for decompression and compression, filtering of the decompressed video and audio signals (e.g., noise reduction), and multipass encoding, to name a few.

In another example, the speculative transcoding manager would examine usage patterns for a particular piece of media content, and find that users had made numerous Real media requests at bit rates of 28.8 k, 128 k, 300 k, but not at 56 k. In this case the lack of a 56 k transcode would be seen as anomalous and, in reaction, the speculative transcoding manager would spawn a request for the content at the 56 k bitrate.

In another example not intended to limit the scope of the invention, the speculative transcoding manager would pre-transcode content based on a publisher's request. If for example, CNN produced daily content, CNN could specify that their content is to be pre-transcoded in real time or slower than real time into Windows Media, Real, and QuickTime formats at 56 k, 128 k, and 300 k. In doing this, CNN could guarantee the availability of their content at the moment they published it externally.

H. Zero-Downtime Reassignment of Servers to Different Tasks, Fault Tolerance, and Zero-Downtime Server Retirement A distributed on-demand media transcoding system according to the present invention can include pools of servers with different capabilities (e.g., transcoding servers, distribution servers serving media content in Real format, distribution servers serving media content in a Windows Media format, distribution servers serving media content in a Quicktime format, distribution servers serving media content in a gMovie format, etc.). In many implementations, these differences in capability are strictly due to installed software. So it is practical to reconfigure a server to perform a different task via automated software that does not require operator intervention.

One variable, when optimizing the quality of service and efficiency of a distributed on-demand media transcoding system, is the allocation of farm servers to these varying tasks. Being able to reallocate available servers on the fly to different tasks allows a media provider request processor to adapt to changing usage patterns while maintaining the best quality of service and efficiency. However, this is difficult to do without interrupting service. A related problem is that of fault tolerance and upgrade. If a server goes down unexpectedly, this must not interrupt service in any other part of the farm. If a server needs to be retired so that it can be upgraded, this too must not interrupt service.

Figure 14:
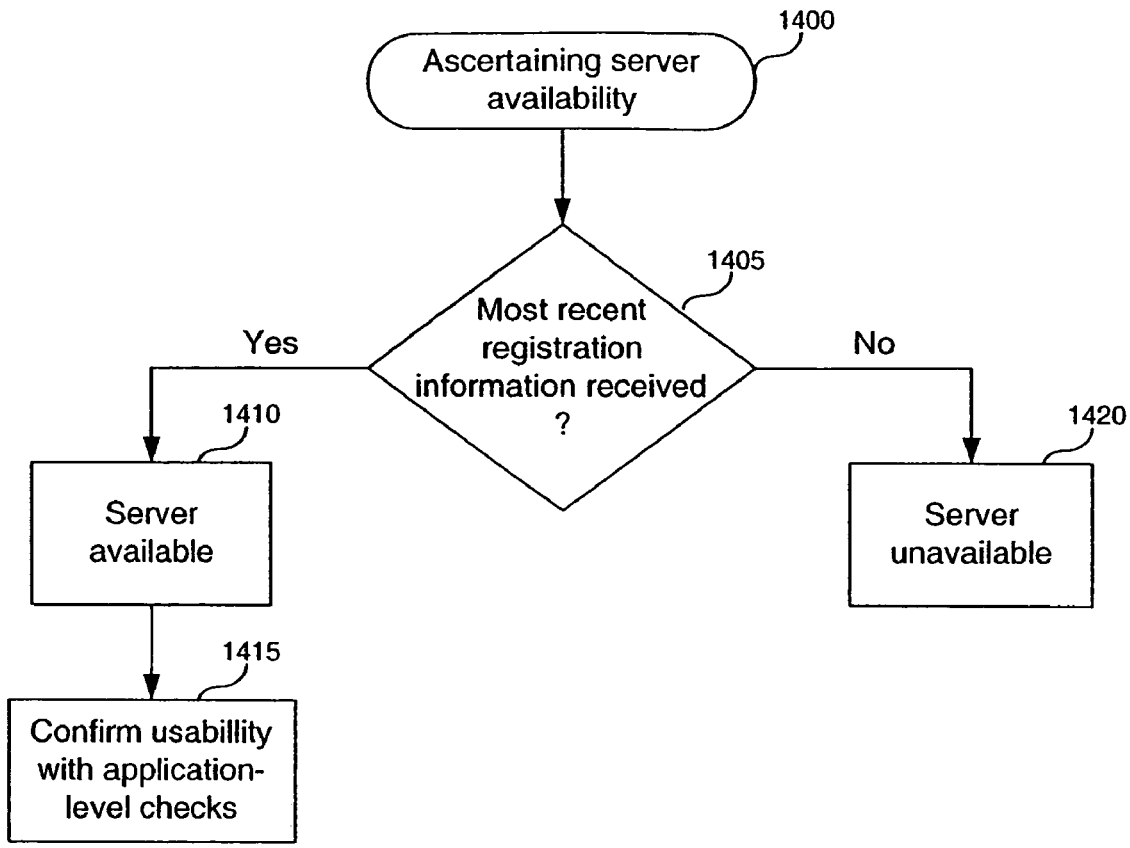
FIG. 14 is a flowchart illustrating the determination of server availability, according to-an embodiment of the invention.

In one embodiment, illustrated in FIG. 14, fault tolerance and upgrade problems are overcome as each server (including, but not limited to, transcoding servers and distribution servers) registers itself with the system in a database (such as database 843 of FIG. 8) when the server is available. In an embodiment of the invention, the database resides at the media provider request processor. The registration information includes a list of the services which that server is configured to perform. The media provider request processor consults the database when seeking machines to perform given tasks. In step 1405, this allows determination as to whether a server's current registration information has been received. Each server is responsible for updating its entry in the database at a fixed period. By ignoring servers which have failed to update their database entry within the fixed period, the media provider request processor can efficiently rule out most unavailable servers (step 1420) without needing to establish communication with them on each query. This saves significant processing and network bandwidth costs.

If the registration information for a server is current, then the server is presumably available, as indicated in step 1410. In step 1415, the media provider request processor then chooses a server from the remaining pool and performs application-level checks to verify that the chosen server is in fact usable. The media provider request processor repeats this process until it finds a server it can use to satisfy the user's request.

Figure 15:
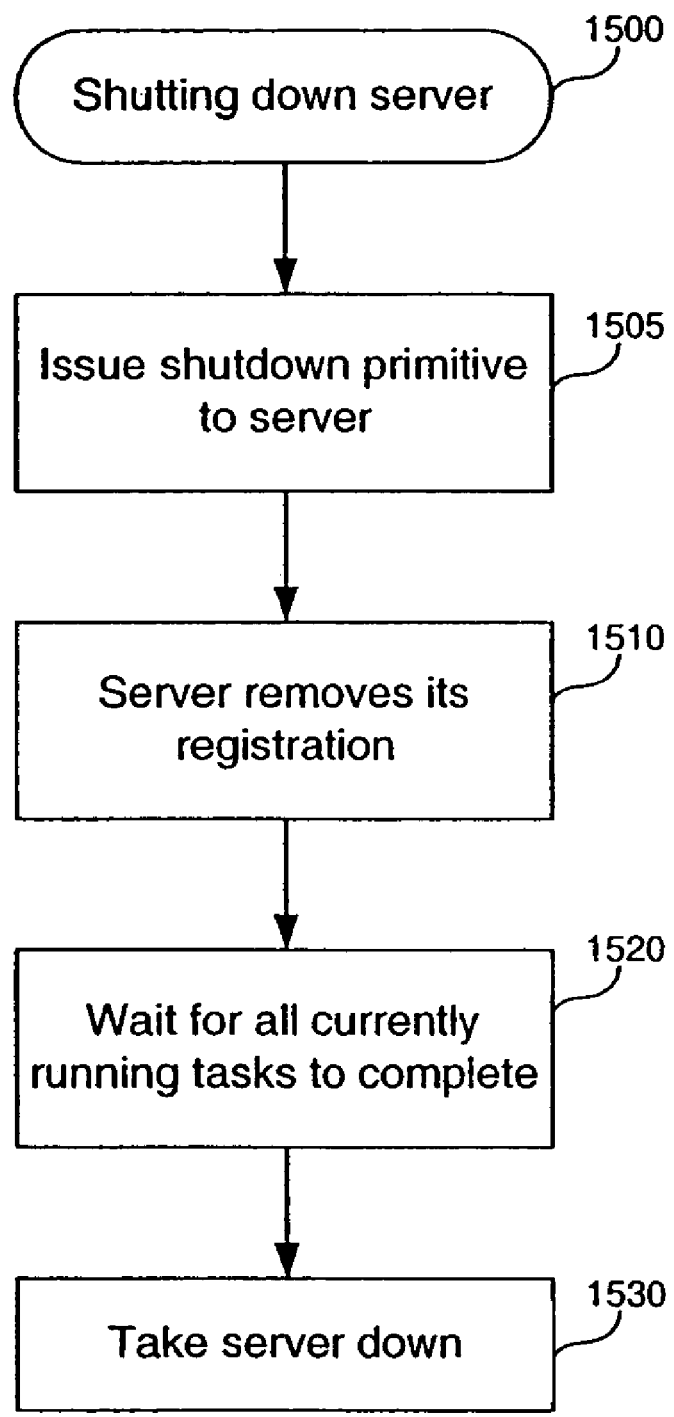
FIG. 15 is a flowchart illustrating the shutting down of a server, according to an embodiment of the invention.

In an embodiment of the invention, each server supports a "shutdown" primitive which will cause it to remove its own entries from the database, thus preventing the media provider request processor from scheduling any new tasks on that server. Then, after all currently running tasks have completed, the server can be taken down without client-visible interruption of service. This process is illustrated in FIG. 15. This shutdown primitive can be activated from an automated system, simplifying the process of upgrading or reassigning a server. In step 1505, a shutdown primitive is issued to the server. In step 1510, the server deletes its registration information from the database on command. In step 1520, any currently running tasks are allowed to complete. In step 1530, the server is taken down.

IV. Data

As described above, the media transcoding system includes one or more transcoding engines that convert certain types of media content (referred to herein as a source type) to another type of media content (referred to herein as a destination type). Transcoding can involve a number of different conversion operations. The particular conversion operations used depend upon the media content and associated publishing variables being converted. "Publishing variables" as used herein refers to different characteristics of media content.

According to the present invention, media content is digital data being published over a network. In this case, publication refers to digital data which has been formatted for delivery over a network and for viewing by a destination media player. Publishing variables for media content can include, but are not limited to, the file format, bit rate, communication protocol(s), physical medium, compression algorithm, and/or digital rights management information.

The digital data can be any type of file format including but not limited to container formats, bitmap formats, video formats, audio formats, vector formats, metafile formats, scene formats, animation formats, multimedia formats, hybrid formats, hypertext and hypermedia formats, three-dimensional data (3D) formats, virtual reality modeling language (VRML) formats, font formats (bitmap fonts, stroke fonts, spline-based outline fonts), page description language (PDL) formats, and any other type of graphics file format or other file format. Table 1 lists examples of such file formats that can be used in embodiments of the present invention:

TABLE 1

Example File Formats

| Format | Type |
|---|---|
| ADOBE ILLUSTRATOR | Metafile |
| ADOBE PHOTOSHOP | Bitmap |
| ATARI ST GRAPHICS FORMATS | Bitmap and Animation |
| AUTOCAD DXF | Vector |
| AUTODESK 3D STUDIO | Scene Description |
| BDF | Bitmap |
| BRL-CAD | Other |
| BUFR | Other |
| CALS RASTER | Bitmap |
| CGM | Metafile |
| CMU FORMATS | Multimedia |
| DKB | Scene Description |
| DORE RASTER FILE FORMAT | Bitmap |
| DPX | Bitmap |
| DR. HALO | Bitmap |
| DVM MOVIE | Animation |
| ENCAPSULATED POSTSCRIPT | Metafile (page description language) |
| FACESAVER | Bitmap |
| FAX FORMATS | Bitmap |
| FITS | Other |
| FLI | Animation |
| GEM RASTER | Bitmap |
| GEM VDI | Metafile |
| GIF | Bitmap |
| GRASP | Animation |
| GRIB | Other |
| HARVARD GRAPHICS | Metafile |
| HIERARCHICAL DATA FORMAT | Metafile |
| IFF | Bitmap |
| IGES | Other |
| INSET PIX | Bitmap |
| INTEL DVI | Multimedia |
| JPEG FILE INTERCHANGE FORMAT | Bitmap |
| KODAK PHOTO CD | Bitmap |
| KODAK YCC | Bitmap |
| LOTUS DIF | Vector |
| LOTUS PIC | Vector |
| LUMENA PAINT | Bitmap |
| MACINTOSH PAINT | Bitmap |
| MACINTOSH PICT | Metafile |
| MICROSOFT PAINT | Bitmap |
| MICROSOFT RIFF | Multimedia |
| MICROSOFT RTF | Metafile |
| MICROSOFT SYLK | Vector |
| MICROSOFT WINDOWS BITMAP | Bitmap |
| MICROSOFT WINDOWS METAFILE | Metafile |
| MIFF | Bitmap |
| MPEG | Other |
| MTV | Scene Description |
| NAPLPS | Metafile |
| NFF | Scene Description |
| OFF | Scene Description |
| OS/2 BITMAP | Bitmap |
| P3D | Scene Description |
| PBM., PGM., PNM., and PPM. | Bitmap |
| PCX | Bitmap |
| PDS | Other |
| PICTOR PC PAINT | Bitmap |
| PIXAR RIB | Scene Description |
| PLOT-10 | Vector |
| PNG | Bitmap |
| POV | Vector |
| PRESENTATION MANAGER METAFILE | Metafile |
| PRT | Scene Description |
| QRT | Scene Description |
| QUICK TIME | Other |
| RADIANCE | Scene Description |
| RAYSHADE | Scene Description |
| RIX | Bitmap |
| RTRACE | Scene Description |
| SAF | Bitmap and other |
| SENSE8 NFF | Scene Description |
| SGI IMAGE FILE FORMAT | Bitmap |
| SGI INVENTOR | Scene Description |
| SGI YAODL | Scene Description |
| SGO | Vector |
| SPIFF | Bitmap |
| SUN ICON | Bitmap |
| SUN RASTER | Bitmap |
| TDDD | Vector and Animation |
| TGA | Bitmap |
| TIFF | Bitmap |
| TTDDD | Vector and Animation |
| URAY | Scene Description |
| UTAH RLE | Bitmap |
| VICAR2 | Bitmap |
| VIFF | Bitmap |
| VIS-5D | Vector |
| VIVID AND BOB | Scene Description |
| WAVEFRONT OBJ | Vector |
| WAVEFRONT RLA | Bitmap |
| WORDPERFECT GRAPHICS METAFILE | Metafile |
| XBM | Bitmap |
| XPM | Bitmap |
| XWD | Bitmap |
| ZBR | Metafile |

See, Murray and vanRyper, pp. 12-26. These examples are illustrative and not intended to necessarily limit the present invention. Other file formats (now known or developed in the future) can be used as would be apparent to a person skilled in the art given this description.

Even within the same file format, digital data can be compressed according to different compression algorithms. In a QUICK TIME formatted file, for example, video can be compressed in accordance with H.263, CINEPAK, JPEG, QT ANIMATION, or QT VIDEO standards. As a further example, in a WINDOWS MEDIA ASF formatted file, audio can be compressed in accordance with the MICROSOFT AUDIO FORMAT, ACELP, VOXWARE, or MP3 standards. Compression algorithm choices can be made based on optimization according to bit-rate choices, or according to the nature of the content. For example, video files in which little motion occurs ("talking heads") and video files in which there is a substantial amount of motion ("high-motion" video) may each be more efficiently compressed using different compression algorithms.

Within any one compression algorithm, there can be further variations. For example, files compressed according to the JPEG standard can be either YUB-based or RGB-based, In addition to the publishing variables set forth above, there are also publishing variables unique to video data and audio data. Publishing variables for video data include the width and height of the video image in pixels as well as the frame rate of the video. Depending on the bit-rate requirements and the nature of the data, different settings may be necessary in order to ensure the best picture quality. For example, some video may be better viewed at 15 frames per second at 160× 120 pixels, while some others may be better viewed at 5 frames per second at 320×240 pixels, even at the same bit-rate. Where the bit-rate is 56K bps, picture quality becomes very limited, and it is almost never optimal to deliver video in 640×480 pixel resolution. Yet another publishing variable for video data is the number of bits per. component.

Publishing variables for audio data include the number of samples per second, the number of channels (e.g., mono, stereo, 5-channel) and the sample size (8-bit, 16-bit, etc.).

Different settings may be necessary to ensure audio quality in light of a particular content type and bit-rate.

Publishing variables may also include the size of data packets being sent and the choice of transmission protocol (e.g., TCP vs. UDP).

Transcoding can therefore be viewed as conversion of data having a source type (defined by a set of publishing variables) to data having a destination type (defined by a second set of publishing variables). Examples are shown in the following tables:

Tables 2-5: Example Transcoder Operations

TABLE 2

| Publishing Variables | Source Type | Destination Type |
|---|---|---|
| physical medium | Disk | Network |
| communication protocol(s) | File I/O | RTSP |
| container format | MPEG1 | QUICK TIME |
| encoding | MPEG1 | SORENSON (video) |
| | | QDESIGN (audio) |
| bit rate | 1.5 Mbps | 300 kbps |

TABLE 3

| Publishing Variables | Source Type | Destination Type |
|---|---|---|
| physical medium | Wired Network | Wireless Network |
| communication protocol(s) | HTTP | MMS |
| container format | MPEG1 | WINDOWS MEDIA |
| encoding | MPEG1 | MPEG4 (video) |
| | | MSAUDIO (audio) |
| bit rate | 1.5 Mbps | 100 kbps |

TABLE 4

| Publishing Variables | Source Type | Destination Type |
|---|---|---|
| physical medium | Wired Network | Wired Network |
| communication protocol(s) | HTTP | RTSP |
| container format | QUICK TIME | REAL |
| encoding | H.263 | REAL PROPRIETARY |
| | | G2 Video/Audio |
| bit rate | 56 kbps | 56 kbps |

TABLE 5

| Publishing Variables | Source Type | Destination Type |
|---|---|---|
| physical medium | Disk | Wireless Network |
| communication protocol(s) | File I/O | HTTP |
| container format | MPEG1 | MP3 |
| Encoding | MPEG1 | audio only - MP3 |
| bit rate | 1.5 Mbps | 16 kbps |

These examples are illustrative and not intended to limit the present invention. Other types of on-demand transcoding operations that are known now or developed in the future can be used as would be apparent to a person skilled in the art given this description.

V. Conclusion

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method of speculatively issuing a batch media provider request for particular media content from a media provider request scheduler to a media provider farm, comprising the steps of:
    (a) determining whether any pre-encodes have been requested by the media provider request scheduler; and
    (b) if any pre-encodes have been requested, issuing one media provider request to the media provider farm, otherwise, predicting a future publishing service request, and issuing a corresponding pre-encode batch media provider request based on prediction,
    wherein predicting the future publishing service is selected from a group consisting of:
        (i) determining whether to re-encode previously transcoded content and generating a higher quality output of the previously transcoded content;
        (ii) requesting content at a different data rate based on transcode records; and
        (iii) pre-transcoding content based on a publisher's request.

2. A method of speculatively issuing a batch media provider request for particular media content from a media provider request scheduler to a media provider farm, comprising the steps of:
    (a) determining whether any pre-encodes have been requested by the media provider request scheduler; and
    (b) if any pre-encodes have been requested, issuing one media provider request to the media provider farm, otherwise, predicting a future publishing service request, and issuing a corresponding pre-encode batch media provider request based on prediction,
    wherein predicting the future publishing service request is selected from a group consisting of:
        (i) determining whether to re-encode previously transcoded content and generating a higher quality output of the previously transcoded content;
        (if) requesting content at a different data rate based on transcode records; and
        (iii) pre-transcoding content based on a publisher's request, wherein the corresponding pre-encode batch media provider request provides speculative transcoding of media content based on the reviewed transcode records during idle times associated with the media provider farm for providing the same quality and quantity of required service using less transcoding servers.

3. A method of speculatively issuing a batch media provider request for particular media content from a media provider request scheduler to a media provider farm, comprising the steps of:
    (a) determining whether any pre-encodes have been requested by the media provider request scheduler; and
    (b) if any pre-encodes have been requested, issuing one media provider request to the media provider farm, otherwise, predicting a future publishing service request, and issuing a corresponding pre-encode batch media provider request based on prediction,
wherein the corresponding pre-encode batch media provider request is selected from a group consisting of:
(i) re-encoding previously real-time-transcoded content in order to generate higher quality encoded content;
(ii) requesting content at a different data rate based on transcode records; and
(iii) pre-transcoding content based on a publisher's request.

* * * * *